United States Patent
Karaki et al.

(10) Patent No.: US 11,277,858 B2
(45) Date of Patent: Mar. 15, 2022

(54) UPLINK TRANSMISSION SCHEME

(71) Applicant: Telefonaktiebolaget LM Ericsson (publ), Stockholm (SE)

(72) Inventors: Reem Karaki, Aachen (DE); Peter Alriksson, Hörby (SE); Jung-Fu Cheng, Fremont, CA (US); Gen Li, Beijing (CN); Amitav Mukherjee, Elk Grove, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 49 days.

(21) Appl. No.: 16/764,287

(22) PCT Filed: Nov. 17, 2017

(86) PCT No.: PCT/CN2017/111511
§ 371 (c)(1),
(2) Date: May 14, 2020

(87) PCT Pub. No.: WO2019/095246
PCT Pub. Date: May 23, 2019

(65) Prior Publication Data
US 2020/0351923 A1  Nov. 5, 2020

(51) Int. Cl.
*H04L 12/18* (2006.01)
*H04W 72/12* (2009.01)
(Continued)

(52) U.S. Cl.
CPC ....... *H04W 72/1284* (2013.01); *H04L 1/1614* (2013.01); *H04L 1/1819* (2013.01);
(Continued)

(58) Field of Classification Search
None
See application file for complete search history.

(56) References Cited

U.S. PATENT DOCUMENTS

| | | | |
|---|---|---|---|
| 2007/0243874 A1 | 10/2007 | Dae-Young et al. | |
| 2008/0152061 A1* | 6/2008 | Kozat | H04L 12/1877 |
| | | | 375/358 |

(Continued)

FOREIGN PATENT DOCUMENTS

CN  101111073 A  1/2008

OTHER PUBLICATIONS

Extended European Search Report issued for Application No./Patent No. 17932040.3-1205 / 3711330 PCT/CN2017111511—dated Oct. 16, 2020.
(Continued)

*Primary Examiner* — Brandon M Renner
(74) *Attorney, Agent, or Firm* — Christopher & Weisberg, P.A.

(57) ABSTRACT

A method in a wireless device for performing an uplink transmission to a base station in a wireless access system, wherein the wireless access system comprises one or more mini-slot configurations, the method comprising performing a clear channel assessment for identifying a transmission opportunity and determining the start of a mini-slots. The wireless device performing an uplink transmission within the determined mini-slot wherein the transmission is performed according to a predetermined configuration for mini-slot communication between the base station and the wireless device, such that the base station can identify the start of the uplink transmission.

22 Claims, 17 Drawing Sheets

(51) Int. Cl.
  *H04L 1/16* (2006.01)
  *H04L 1/18* (2006.01)
  *H04L 5/00* (2006.01)
  *H04W 72/04* (2009.01)
  *H04W 72/14* (2009.01)
  *H04W 74/08* (2009.01)

(52) U.S. Cl.
  CPC ....... *H04L 5/0094* (2013.01); *H04W 72/0446* (2013.01); *H04W 72/14* (2013.01); *H04W 74/0808* (2013.01)

(56) References Cited

U.S. PATENT DOCUMENTS

| | | | |
|---|---|---|---|
| 2009/0141739 A1 | 6/2009 | Hong et al. | |
| 2010/0209105 A1 | 8/2010 | Shin et al. | |
| 2017/0353963 A1* | 12/2017 | Hong | H04W 72/082 |
| 2018/0098342 A1* | 4/2018 | Jiang | H04L 27/2602 |
| 2019/0007959 A1* | 1/2019 | Hwang | H04W 72/0446 |
| 2019/0075581 A1* | 3/2019 | Salem | H04W 74/006 |
| 2019/0098590 A1* | 3/2019 | Nam | H04W 24/08 |
| 2019/0150198 A1* | 5/2019 | Sun | H04L 5/0048 370/329 |
| 2019/0215831 A1* | 7/2019 | Baldemair | H04W 72/0446 |
| 2020/0374048 A1* | 11/2020 | Lei | H04W 52/146 |

OTHER PUBLICATIONS

3GPP TSG RAN WG1 Meeting #86bis; Lisbon, Portugal; Source: Huawei, HiSilicon; Title: Discussion on slot and mini-slot (R1-1608837)—Oct. 10-14, 2016.

3GPP TSG RAN WG1 Meeting #87; Reno, USA; Source: ZTE, ZTE Microelectronics; Title: About Mini-Slots (R1-1611286)—Nov. 14-18, 2016.

3GPP TSG RAN WG1 NR Ad Hoc Meeting; Qingdao, China; Source: Huawei, HiSilicon; Title: Discussion on data transmission duration (R1-1709994)—Jun. 27-30, 2017.

3GPP TSG RAN WG1 Meeting 90bis; Prague, Czech Republic; Source: Huawei, HiSilicon; Title: NR frame strauture on unlicensed bands (R1-1717913)—Oct. 9-13, 2017.

PCT Notification of Transmittal of the International Search Report and the Written Opinion of the International Searching Authority, or the Declaration issued for International application No. PCT/CN2017/111511—dated May 31, 2018.

* cited by examiner

UPLINK TRANSMISSION SCHEME

PRIORITY

This nonprovisional application is a U.S. National Stage Filing under 35 U.S.C. § 371 of International Patent Application Serial No. PCT/CN2017/111511 filed Nov. 17, 2017 and entitled "UPLINK TRANSMISSION SCHEME" which is hereby incorporated by reference in its entirety.

TECHNICAL FIELD

The present disclosure relates, in general, to wireless communications and, more particularly, to uplink transmission in a license assisted access with mini-slot configuration.

BACKGROUND

Currently the 5th generation of cellular telecommunication system, called New Radio (NR), is being standardized by Third Generation Partnership Project (3GPP). NR is being developed for maximum flexibility to support multiple and substantially different use cases. Besides the typical mobile broadband use case, also machine type communication (MTC), ultra-low latency critical communications (ULLCC) or ultra-reliable low latency communications (URLLC), side-link device-to-device (D2D) and several other use cases.

In NR the basic scheduling unit is called a slot. A slot consists of 14 Orthogonal Frequency Division Multiplexed (OFDM) symbols for the normal cyclic prefix configuration. As an example a slot with 14 symbols at 60 kHz subcarrier-spacing is 250 us (micro-seconds) long.

The first OFDM symbol(s) of a slot contains control information for the user equipment (UE), the so called control region. This control information can for example comprise downlink assignments or uplink grants.

To reduce latencies a mechanism called mini-slots has been introduced in NR. A mini-slot is a slot that has fewer OFDM symbols than a regular slot. Current agreements suggest mini-slots of length between 1 and 14 OFDM symbols.

Similar to a slot, the first OFDM symbol(s) of a mini-slot contains control information. Thus for a UE to be able to be scheduled using mini-slots, it must monitor the control region of every possible location of the mini-slot. For example, if the mini-slot comprises two symbols and one is the control region, the UE needs to monitor the control region every second OFDM symbol.

NR also supports flexible bandwidth configurations for different UEs on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous physical resource blocks (PRBs).

Reserved resources can be configured within the bandwidth part. The bandwidth of a bandwidth part is equal to or is smaller than the maximum bandwidth capability supported by a UE.

Cells served by a radio base station, also termed 'base station' herein for brevity, for example a gNB in NR, may operate using unlicensed spectrum. For a node, such as a wireless device or UE or the radio base station, to be allowed to transmit in unlicensed spectrum, e.g. the 5 GHz band, the node typically needs to perform a clear channel assessment (CCA) or listen before talk (LBT) operation. This procedure may include sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium to be idle a node is typically allowed to transmit for a certain amount of time. This time period is sometimes referred to as transmission opportunity (TXOP). The length of the TXOP may depend on regulation (for example standards bodies and/or government regulatory bodies) and the type of CCA that has been performed, but typically ranges from 1 ms to 10 ms.

3GPP long term evolution (LTE) license assisted access (LAA) supports several methods for reducing the complexity of control channel monitoring for unlicensed band UEs. The eNB can enable/disable monitoring of certain DCI formats using RRC signaling. For the DCI formats that the UE monitors, the eNB can configure the number of blind decodes for each aggregation level for a given DCI format.

The mini-slot concept in NR allows a node to access the channel at a much finer granularity compared to e.g. LTE LAA where the channel could only be accessed at 500 us intervals. Using for example 60 kHz subcarrier-spacing and a two symbol mini-slot in NR, the channel can be accessed at 36 us intervals.

However, since every mini-slot contains control signaling it is expected that mini-slots introduce higher signaling overhead as compared to full slot transmissions. Improvements to the scheduling and control signaling overhead are therefore desired to enable the use of mini-slots for unlicensed access.

SUMMARY

Methods and apparatus are disclosed to provide improvements to the uplink transmission from a wireless device in a communications system wherein the wireless device is required to perform a clear channel assessment procedure before transmitting is uplink data.

An embodiment comprising a method in a wireless device for performing an uplink transmission to a base station is provided, wherein the wireless device is suitable for operating in a wireless access system which comprises one or more mini-slot configurations, wherein a mini-slot configuration comprises one or more orthogonal frequency division multiplexed, OFDM, symbol intervals and is a sub-division of a slot. The method comprises performing a clear channel assessment to identify a transmission opportunity and determining the start of a mini-slot that is closest to the start of the transmission opportunity. The wireless device performs an uplink transmission within the determined mini-slot, wherein the transmission is performed according to a predetermined configuration for mini-slot communication between the base station and the wireless device, such that the base station can identify the start of the uplink transmission. One advantage of such a method is that the wireless device has greater freedom to transmit as soon as the channel is found to be clear but the wireless device does not need to indicate explicitly when the transmission begins. This saves signalling and latency through avoiding any additional steps between the determined transmission opportunity and the transmission of the uplink data. Through predetermined configuration the base station can determine the starting symbol of the uplink transmission and thereby any succeeding mini-slot transmissions. Support of multiple starting positions within a slot provides for flexible and efficient channel access on unlicensed spectrum. Reduced uplink transmission delay increases the overall system performance. The embodiment enables efficient UL scheduling and transmission when multiple starting/ending positions is supported. The overhead for providing mini-slot communication is thus also reduced.

In one example of the above embodiment the mini-slot configuration comprises one of a plurality of mini-slot configurations and wherein each mini-slot configuration defines the number of mini-slots within a slot, the positions of mini-slots within a slot, and the number of OFDM symbols for each mini-slot.

In some examples of the above embodiment the mini-slot configuration comprises a demodulation reference signal in a configured OFDM symbol position and the demodulation reference signal location within an OFDM symbol in the slot identifies the mini-slot configuration being used and/or the start of the uplink transmission.

In further examples of the above embodiment a plurality of mini-slot configurations are preconfigured and determining the start of a mini-slot that is closest to the start of the transmission opportunity comprises the wireless device selecting one of the plurality of mini-slot configurations.

In another embodiment, a method in a base station for receiving an uplink transmission from a wireless device is disclosed. The bases station is suitable for operating in a wireless access system, wherein the wireless access system comprises one or more mini-slot configurations. A mini-slot configuration comprises one or more orthogonal frequency division multiplexed, OFDM, symbol intervals and is a sub-division of a slot. The method comprises receiving an uplink transmission, from the wireless device, within a mini-slot, wherein the transmission is performed according to a predetermined configuration for mini-slot communication between the base station and the wireless device, such that the base station can identify the start of the uplink transmission. This provides the advantage that a base station can schedule a wireless device for transmission wherein the uplink transmission is dependent on the wireless device obtaining a clear channel before transmission The base station can receive uplink transmissions as soon as the wireless device is able to transmit and without the wireless device having to provide additional signalling to indicate when, in a slot, the transmission occurs when transmitting in mini-slot configuration.

In one aspect of the above embodiment the mini-slot configuration comprises one of a plurality of mini-slot configurations wherein, for each slot, the number of mini-slots is fixed, and for each mini-slot the number of OFDM symbols is fixed for that mini-slot and the starting position for that mini-slot, within the slot, is fixed.

In another aspect the mini-slot configuration comprises a demodulation reference signal in a configured OFDM symbol position and the demodulation reference signal location within an OFDM symbol in the slot identifies the mini-slot configuration being used and/or the start of the uplink transmission.

In another aspect of the embodiment, the method comprises sending an indication of the plurality of mini-slot configurations to the wireless device.

In a further aspect the embodiment comprises sending, to the wireless device, an indication of a mini-slot configuration to be used for the uplink transmission.

In another embodiment a wireless device for performing an uplink transmission to a base station in a wireless access system is disclosed. The wireless device is suitable for operating in a wireless access system which comprises one or more mini-slot configurations. A mini-slot configuration comprises one or more orthogonal frequency division multiplexed, OFDM, symbol intervals and is a sub-division of a slot. The wireless device comprises a processor, a memory and a transceiver circuit, wherein the processor is configured to perform, via the transceiver circuit, a clear channel assessment to identify a transmission opportunity. The processor is further configured to determine the start of a mini-slot that is closest to the start of the transmission opportunity. The processor is also configured to perform, via the transceiver circuit, an uplink transmission within the determined mini-slot, wherein the transmission is performed according to a predetermined configuration for mini-slot communication between the base station and the wireless device, such that the base station can identify the start of the uplink transmission. Advantages of such a wireless device is that it can perform an uplink transmission earlier in the transmission slot, i.e. it does not need to wait for the start of the slot and it does not need to signal explicitly when it is starting the transmission.

In another embodiment a base station suitable for receiving an uplink transmission from a wireless device in a wireless access system is disclosed. The wireless access system comprises one or more mini-slot configurations, wherein a mini-slot configuration comprises one or more orthogonal frequency division multiplexed, OFDM, symbol intervals and is a sub-division of a slot. The base comprises a processor, a memory and a transceiver circuit wherein the processor is configured to receive, via the transceiver circuit, an uplink transmission, from the wireless device, within a mini-slot, wherein the transmission is performed according to a predetermined configuration for mini-slot communication between the base station and the wireless device, such that the base station can identify the start of the uplink transmission. This embodiment provides a base station which is able to receive uplink transmissions from a wireless device earlier in the slot than if the wireless device always had to wait until the start of a full slot. The base station does not need to receive explicit signalling indicating the start of the transmission from the wireless device. This provides an advantage that the base station resources are better utilised since symbols of a partial slot at the time of the transmission opportunity are not missed for transmission.

In other embodiments a computer program, program product or carrier containing a program comprising instructions for performing an uplink transmission to a base station in a wireless access system, wherein the wireless access system comprises one or more mini-slot configurations are disclosed. A mini-slot configuration comprises one or more orthogonal frequency division multiplexed, OFDM, symbol intervals and is a sub-division of a slot, the instructions, when executed on a processor, perform any of the above described embodiments.

DETAILED DESCRIPTION

The embodiments disclosed herein are directed to a wireless device or UE and a radio base station or gNB in a communications system which comprises a wireless access system deploying one or more mini-slots. A mini-slot may be described as a sub-division of a slot, wherein a slot is a basic scheduling unit in the time domain. A mini-slot may comprise one or more orthogonal frequency division multiplexed, OFDM, symbol intervals.

Cells served by the radio base station, for example a gNB in NR, which operate using unlicensed spectrum require the wireless device or UE to perform a clear channel assessment (CCA) or listen before talk (LBT) operation before performing an uplink transmission. This procedure may include sensing the medium to be idle for a number of time intervals. After sensing the medium to be idle the wireless device is typically allowed to transmit for a certain amount of time. This time period is referred to herein as a transmission opportunity (TXOP).

To reduce signaling overhead, once the UE has gained access to the channel, in many cases scheduling with slot granularity is sufficient. However, since the UE is gNB controlled (scheduled by an earlier grant) the gNB does not know when the UE will get access to the medium and therefore cannot know which slots should be scheduled as full or mini-slots. To accommodate for the worst case, all the granted slots should be scheduled based on mini-slots. Additionally the speed that the UE can switch from mini-slot to slot depends on the UE capabilities and processing latency (i.e. scheduling, L2, L1 processing) since the preparation of the packets starts earlier.

Figure 1:
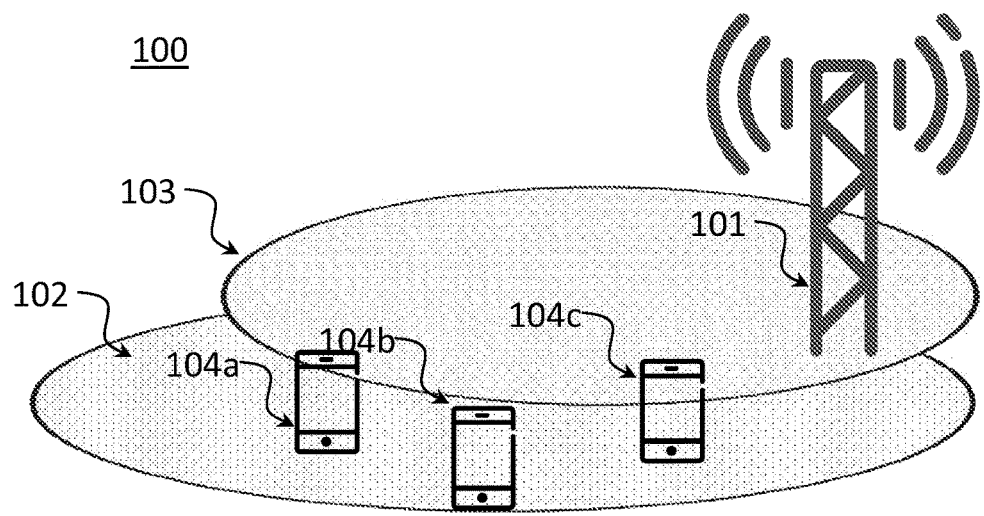
FIG. 1 is an example network environment according to embodiments of the present disclosure.

FIG. 1 depicts an exemplary network according to the embodiments herein. A communications system 100 comprises at least one radio base station 101 which serves a plurality of wireless devices 104a, 104b, 104c; generically referred to herein 104. The radio base station serves the plurality of wireless devices via radio spectrum providing a cellular radio coverage 102, 103, wherein one or more cells may operate on licensed spectrum 102 and one or more cells may operate on unlicensed spectrum 103. For example the system may comprise a primary cell operating on the licensed spectrum, 102, and one or more secondary cells 103 operating on the unlicensed spectrum.

The radio base station may provide scheduling for uplink transmissions from the wireless device to transmit in the unlicensed cell. The scheduling may be performed by the primary cell, also termed cross carrier scheduling. Alternatively the scheduling may be performed on the unlicensed carrier, termed self-scheduling.

In some examples the wireless device may perform autonomous or unscheduled unlicensed access. For example if the gNB gives the UE an semi-persistent grant (SPS) that it can use autonomously, the methods in the application can be used for the gNB to identify where in the slot the UL transmission started.

When a wireless device performs a LBT procedure such as a clear channel assessment (CCA) and determines the channel to be free, the time period until the next full slot boundary may be the duration of many symbols, the exact time period being dependent on the subcarrier spacing. If the wireless device can transmit in a mini-slot within the slot period during which the wireless device has determined the channel to be free then the wireless device can begin transmissions earlier than if it had to wait for the start of the next full slot. For ultra reliable low latency communications (URLLC) there is a distinct advantage to being able to do this, especially in an unlicensed cell where each transmission burst must be preceded by a CCA procedure. This advantage also occurs for non-URLLC devices as their likelihood to gain access to the channel increases.

Figure 2:
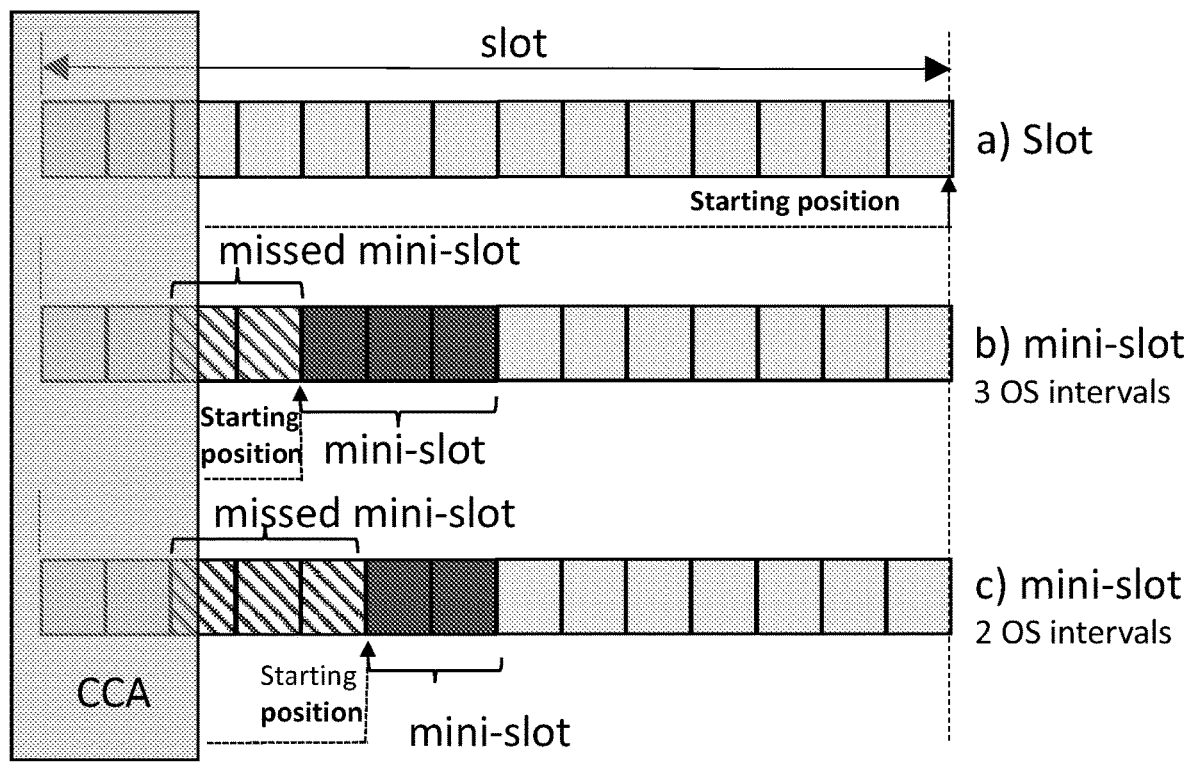
FIG. 2 illustrates example embodiments of the present disclosure.

FIG. 2 depicts an example where a wireless device determines the channel to be clear, in three cases (a, b, c) where different slot configurations are depicted. In all examples the slot length is 1 ms and comprises 14 OFDM symbols (OS) although other slot durations may equally be considered such as 250 us in case of 60 KHz subcarrier spacing. The LBT or CCA process may detect channel usage or 'interference' as depicted in the shaded area covering the first two and half symbols in each of the examples of FIG. 2. In FIG. 2 a) the slots are full length and thus at the end of the LBT period, or CCA process and the channel is determined to be clear, the wireless device must wait for the next slot boundary before commencing its uplink transmission; in this example 4 symbol intervals occur between the end of the CCA and the start of the uplink transmission. In FIG. 2 b) a mini-slot configuration is supported with a fixed configuration of 2, 2,3,2,2 and 3 symbol length mini-slots, the wireless device is thus able to transmit after waiting 1 more symbol interval. In FIG. 2 c) a fixed configuration of 2,3,2,2,3, and 2 symbol length mini-slot is supported and the wireless device waits 2 symbol intervals before commencing its uplink transmission. The embodiments disclosed herein are independent of the exact mini-slot configurations; the configurations described and depicted in the figures are exemplary. Any number of mini-slots per slot, number of OFDM symbols in each mini-slot and repetition or unique sequences of mini-slots may be configured. In a communications system where a wireless device is able to transmit in the earliest possible mini-slot after determining the channel to be clear the base station to which the uplink transmission is directed needs to be able to determine that the wireless device is transmitting in that mini-slot.

In one embodiment a wireless device or UE performs a clear channel assessment (CCA) operation to detect or identify a transmission opportunity. The wireless device then determines whether the start of the transmission opportunity is closest to the start of a slot or the start of one of one or more mini-slots. When the transmission opportunity is closest to the start of one of the one or more mini-slots the wireless device starts an uplink transmission within the mini-slot according to a configuration for said mini-slot such that the base station can identify the start of the uplink transmission in said mini-slot. The transmission is performed according to a predetermined configuration for mini-slot communication between the base station and the wireless device, such that the base station can identify the start of the uplink transmission.

Multi-mini slot scheduling can be used to reduce grant signalling overhead. With multi-mini slot scheduling, a single uplink grant in a downlink slot or mini-slot can be used to schedule a single or multiple consecutive uplink slot or mini-slot transmissions.

In one example a plurality of mini-slot configurations are preconfigured and determining the start of a mini-slot that is closest to the start of the transmission opportunity involves the wireless device selecting one of the plurality of mini-slot configurations.

Figure 3:
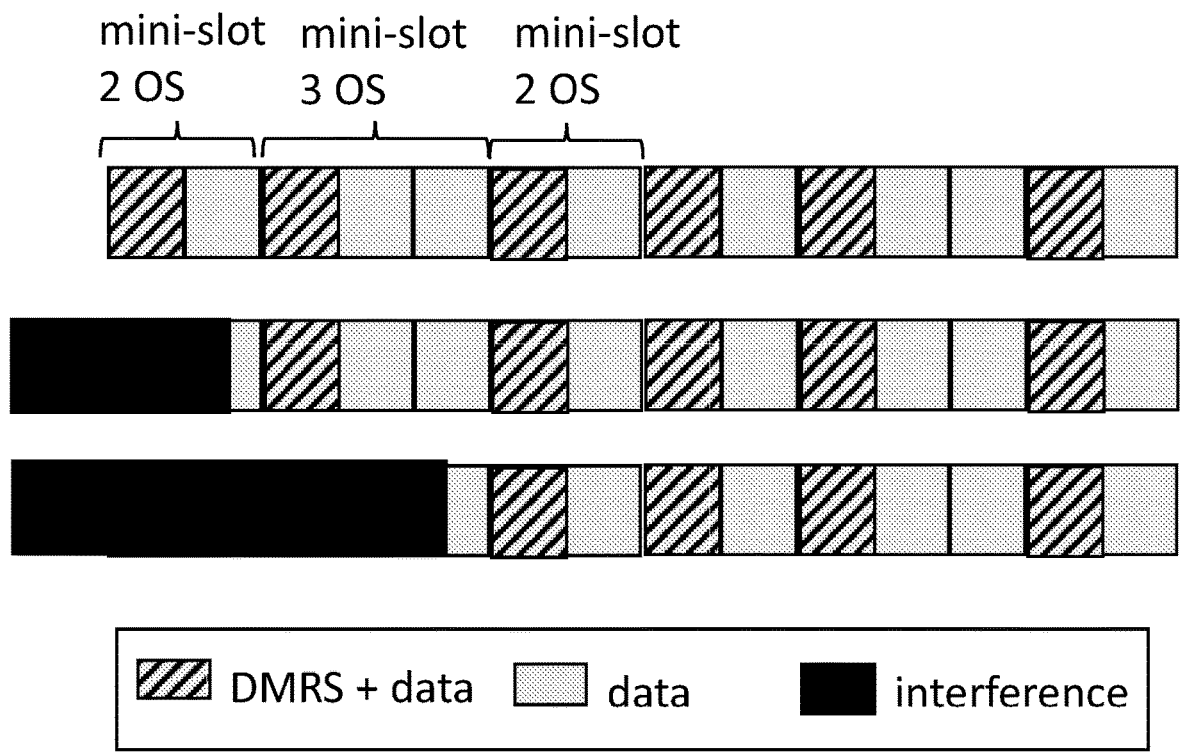
FIG. 3 illustrates further example embodiments of the present disclosure.

As another aspect of this embodiment reference signal location and reference signal density could be used to help the base station (e.g. gNB) distinguish at which mini-slot the transmission started. In one example the wireless device (e.g. UE) follows a fixed mini-slot configuration, e.g. three mini-slots {2,3,2,2,3,2} symbol intervals in a 14 symbol duration slot as shown in FIG. 3. Each mini-slot is self-contained in terms of control and DMRS. The gNB monitors the presence of DMRS in preconfigured locations to identify the mini-slot in which the transmission starts.

Figure 4:
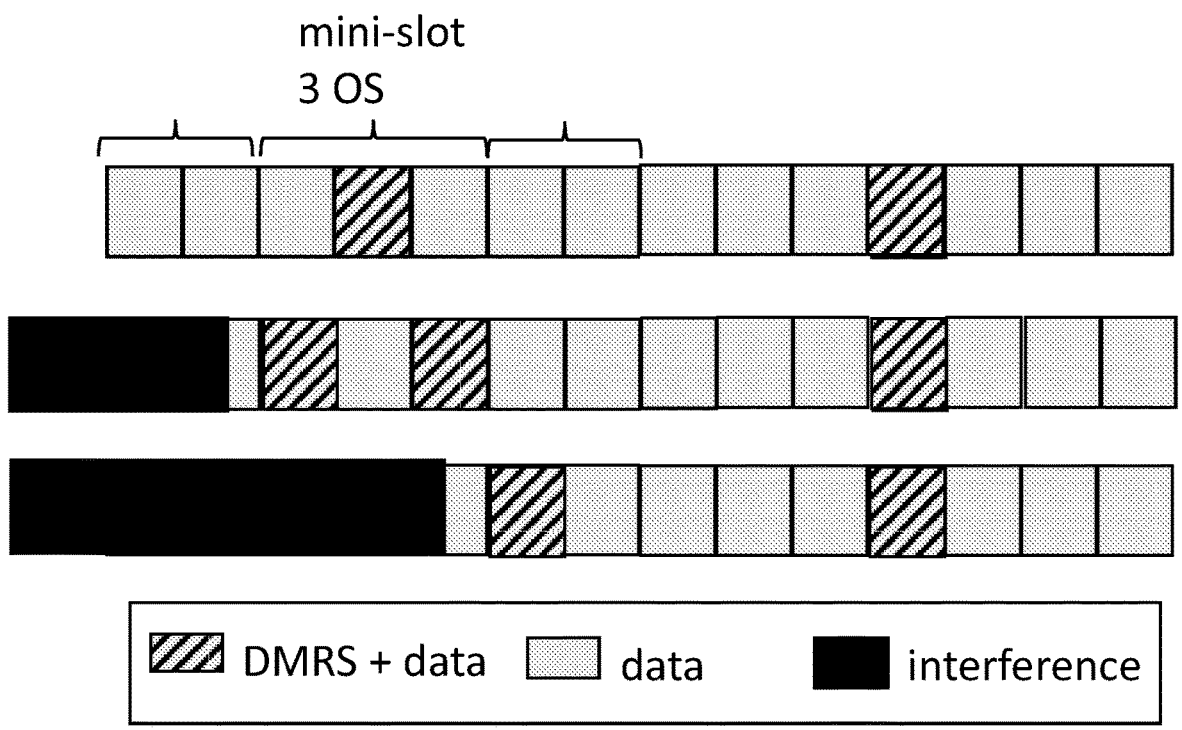
FIG. 4 illustrates further example embodiments of the present disclosure.

In an alternative example, not every mini-slot in a slot contains a DMRS transmission. DMRS can be shared among consecutive mini-slots. However, the DMRS locations may be different for every starting point. So that each starting point is uniquely distinguishable as shown in FIG. 4. In the examples depicted in FIG. 4, in more detail, if the wireless device is able to start the uplink transmission at the beginning of the slot then no DMRS is sent until the next mini-slot, wherein the DMRS is a single symbol shared with the preceding mini-slot and the succeeding mini-slot. In some examples this is a full slot transmission using the full slot configuration. In the second example the wireless device does not get a clear channel until after the first mini-slot has commenced its next transmission opportunity is closest to start of the second mini-slot and in this case the wireless device transmits the DMRS in the first symbol and the third symbol of the second mini-slot, thereby identifying this uplink transmission as commencing in this mini-slot. In the third example of FIG. 4, the transmission opportunity is closest to the last mini-slot and in the start of the uplink transmission is identified by the DMRS being transmitted in the first symbol of the mini-slot. In some examples the mini-slot configuration is predefined such that the base station only looks for the predefined configurations. In other examples the mini-slot configuration may be configured for example during the scheduling such that the radio access node or base station indicates to the wireless device in which symbol it should include DMRS for a certain mini-slot length if the mini-slot is used for the start of the uplink transmission or burst.

To reduce the mini-slot control overhead (DMRS+UL control), one or more approaches may be used.

In one approach the base station or gNB schedules the first uplink slot in a scheduled burst to use mini-slots and subsequent slots to use full slot scheduling. In this case, if the UE fails to access the channel during the first scheduled slot, the later slots are used as full slots, in other words they have only the one starting point.

Figure 5:
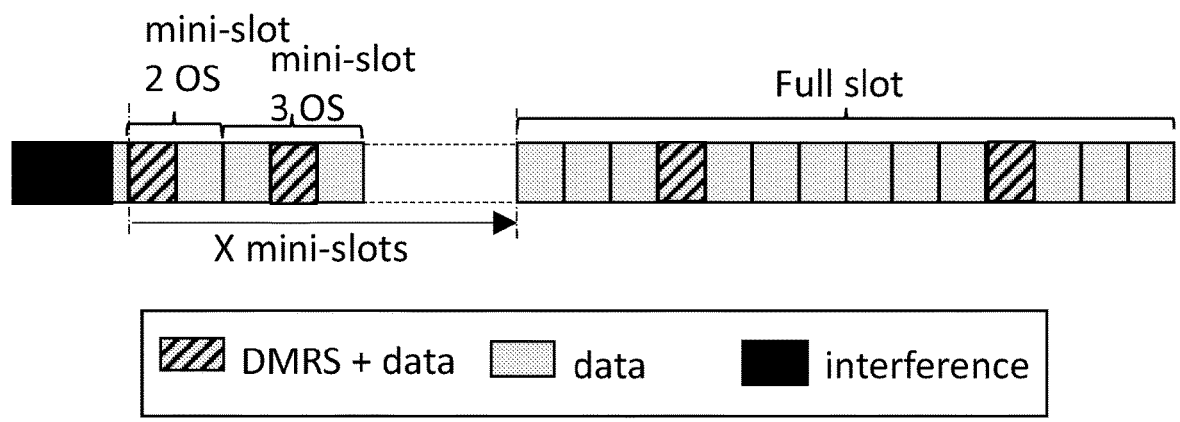
FIG. 5 illustrates a further example embodiment of the present disclosure.

In another approach the base station or gNB schedules multiple consecutive uplink slots. The UE is defined to operate on both slot and mini-slot configurations. The slots in which mini-slot transmission is used are not fixed. The UE attempts to access the channel using the mini-slot concept. Depending on the configured mini-slot configuration, the UE will have multiple starting points within a slot duration. If the UE succeeds to access the channel, it transmits using mini-slot configurations for a number of mini-slots. Subsequent slots are transmitted using slot transmissions. FIG. 5 shows an example where the wireless device begins transmitting in the first mini-slot after obtaining a clear channel, the wireless device then continues its transmission burst over X number of mini-slots before switching to a full slot transmission. In some examples X is the number of mini-slots until the earliest full slot boundary. In some examples the number of mini-slot transmissions, X, is defined or configured by the radio access node or base station (e.g. gNB). In further examples the number of mini-slot transmissions, X, depends on the UE capabilities. In other examples the number of mini-slot transmissions before switching to full slot transmission is the time required to prepare for a full slot transmission.

Figure 6:
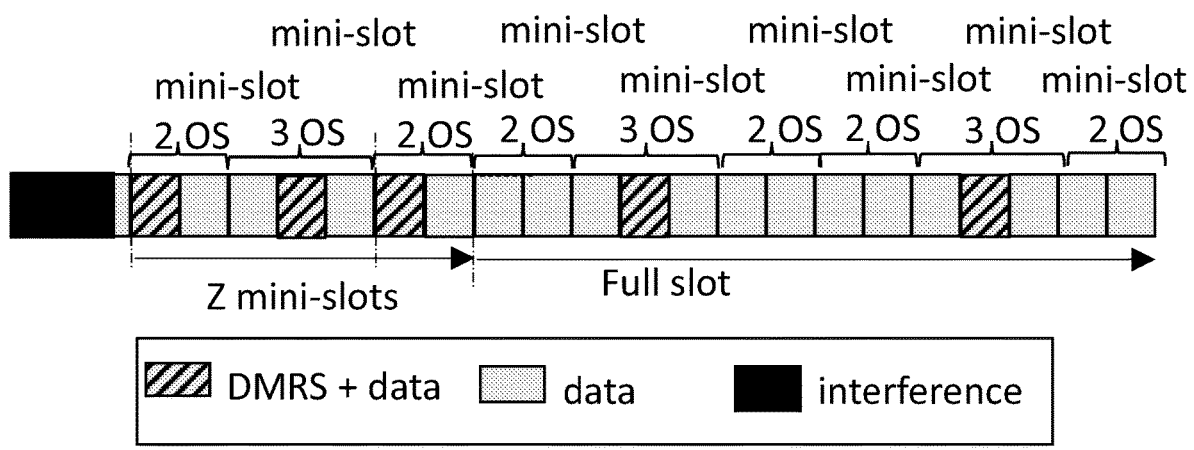
FIG. 6 illustrates a further example embodiment of the present disclosure.

In another approach the demodulation reference signal (DMRS) density (per mini slots) is reduced after the first number of transmitted mini-slots. Subsequent mini-slots are transmitted using lower DMRS density. In some examples the number of DMRS per mini-slot is less than 1, which means one or more DMRS is shared between multiple consecutive mini slots. In FIG. 6 an example is shown where the wireless device transmits according to a number of configured mini-slot configurations, each with a DMRS included in one of the data symbol transmissions. After a number of mini-slot transmissions, Z, the wireless device switches to a second mini-slot configuration wherein only one DMRS symbol is transmitted per slot. In other examples the number of DMRS may be 2 or more DMRS per slot.

Figure 7:
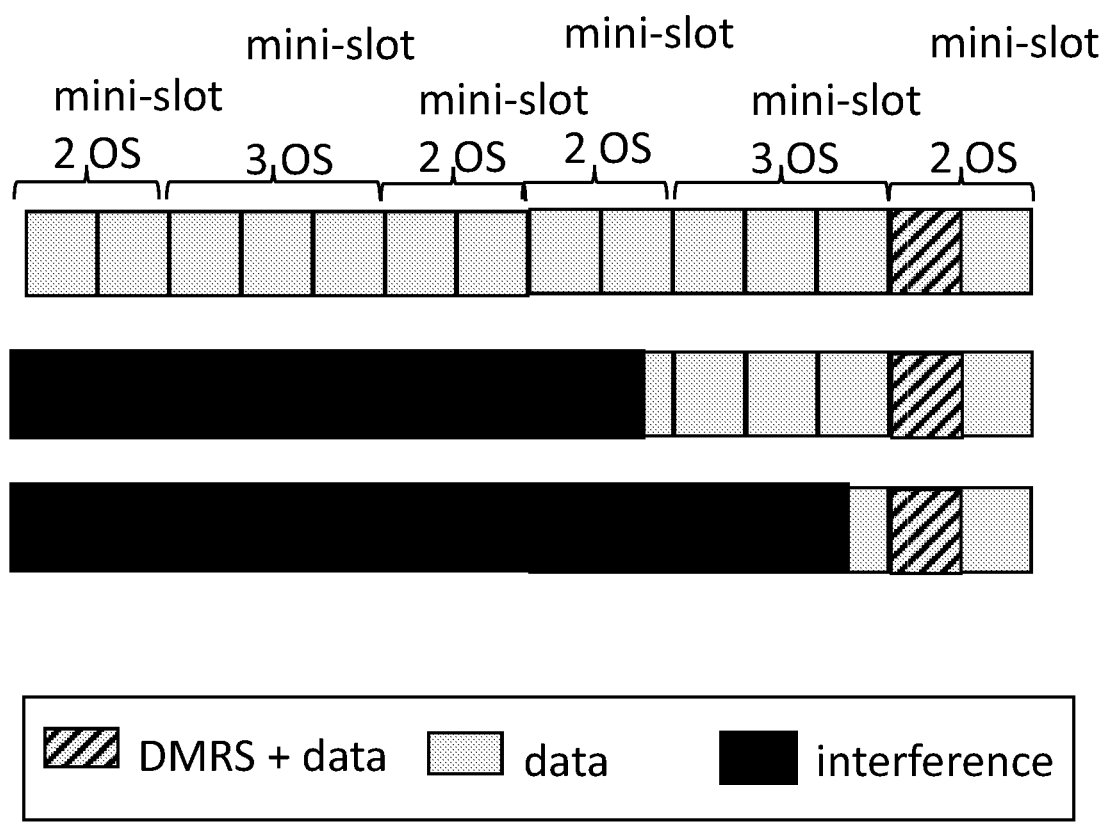
FIG. 7 illustrates further example embodiments of the present disclosure.

In another approach the DMRS is located in the last mini-slot of every slot and shared with preceding mini-slots within the same slot. In this way the usage of mini-slot concept does not unnecessarily increase the L1 overhead. The DMRS overhead is kept low and regardless of the starting point, a slot will have at least one DMRS occasion. An example of this approach is depicted in FIG. 7, wherein the last mini-slot of the slot comprises 2 symbols and the DMRS is transmitted in the first OFDM symbol of the last mini-slot. While this provides the base station (e.g. gNB) with an indication that mini-slot transmission is implemented a different DMRS configuration may be needed for the first mini-slot transmission to indicate the start of the uplink transmission and then the configuration resumes with only a DMRS in the first symbol of the last mini-slot. Alternatively, the mini-slot configuration is determined by the DMRS (i.e. each mini-slot configuration has a unique last mini-slot starting symbol position in which the DMRS is transmitted) and the base station determines the start of the uplink transmission based on the detected last mini-slot and knowing the starting points of the preceding mini-slots in the predefined mini-slot configuration.

By switching to a lower DMRS periodicity (i.e. DMRS density) or from mini-slot transmission to slot transmission, the UE can fit a larger transport block size in a transmission burst. In some examples the gNB can provide the UE with two different transport block sizes, for example via PDCCH signalling. Wherein the UE or wireless device applies the larger transport size after switching to the lower DMRS density or to a full slot transmission.

In another example the UE or wireless device is configured to scale up the transport block size when needed. For example the wireless device may determine the TB size with a formula. The UE can then increase the TB size when there are more resources as long as the gNB knows how much more resources that are available.

In another aspect, multiple mini-slots within one slot could share the same hybrid automatic repeat request (HARQ) process when the number of available HARQ processes is not sufficient for each scheduled mini-slot. In current systems, each mini-slot would have a corresponding HARQ process. However, the maximum number of HARQ processes is limited such that there may not be enough available HARQ processes to have multi-mini slot scheduling covering the whole of the maximum channel occupancy time (MOOT).

Figure 8:
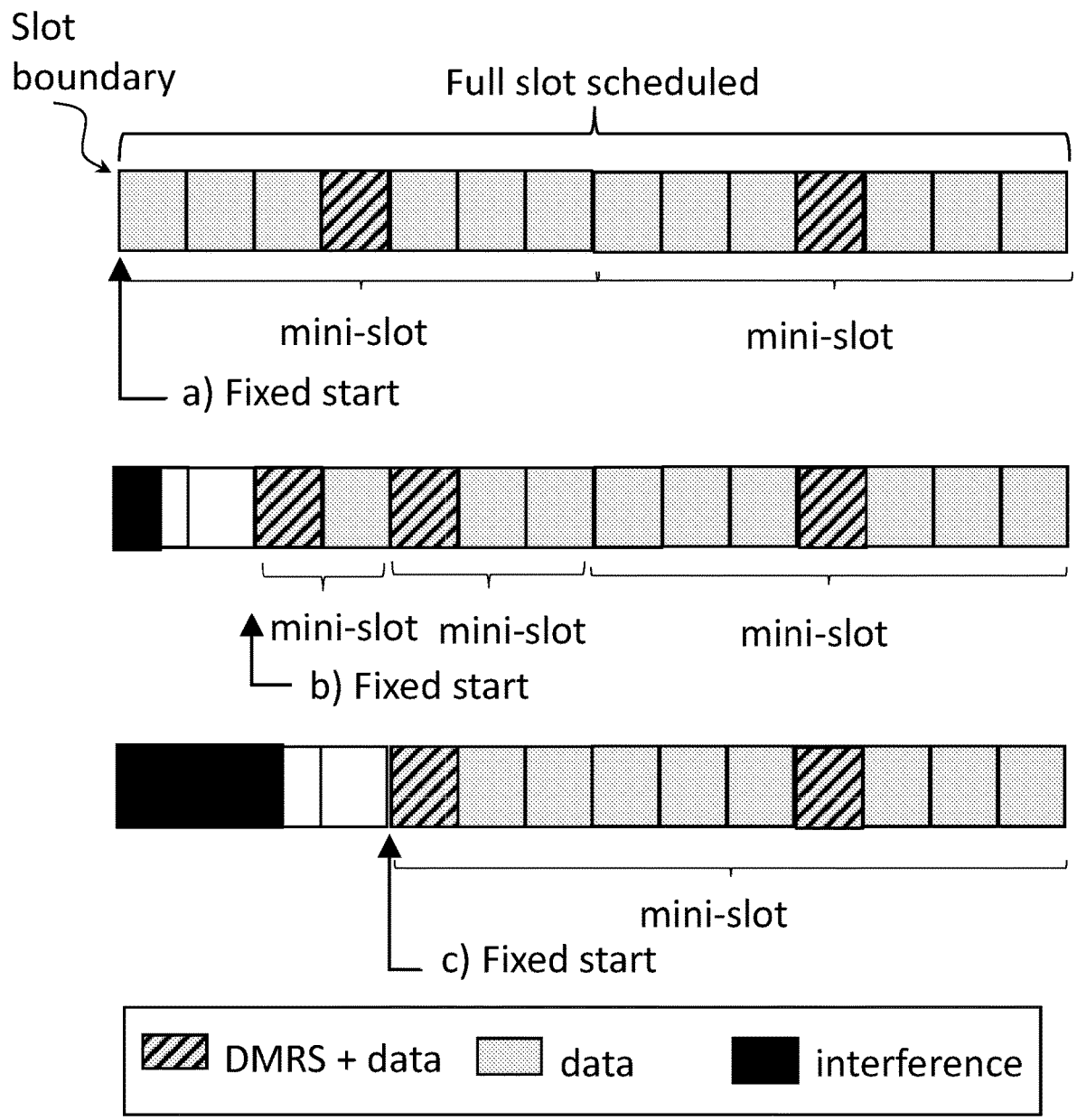
FIG. 8 illustrates further example embodiments of the present disclosure.

For example, if the available number of HARQ processes is 8 and the time duration of a mini-slot is 150 us, the base station can only schedule 150 us×8=1.2 ms consecutive transmissions whereas an allowed MOOT would be greater than 1.2 ms. In an example of the proposed embodiment, a number of mini-slots within one slot could share one HARQ process according to the following scheme:
  The base station (e.g. gNB) calculates how many slots are covered for the scheduled multi mini-slots and indicates a HARQ process ID for each slot. In some examples the HARQ process ID is indicated explicitly. In other examples the HARQ process ID is indicated implicitly, for example one HARQ ID is included for the scheduling grant and the remaining IDs are derived from the first ID;
  The transport block in each mini-slot could be considered as one coding block group and a bit map based feedback for multi mini-slot could be used.
In another embodiment, the base station (e.g. gNB) performs scheduling and link adaptation assuming a full slot transmission although uplink transmission can start on other positions than the slot boundary. The wireless device may be thought of as creating a mini-slot dynamically. As such, mini-slot configuration is predetermined in that the mini-slot comprises the remainder of the slot with an identified starting position. In some examples the starting points are defined by the gNB for example via radio resource control (RRC) or physical dedicated control channel (PDCCH) configuration as additional starting points within a slot. In other examples the wireless device (e.g UE) can be configured with different mini slot lengths that start at fixed locations. In some aspects of this embodiment, reference signal location or reference signal density is used to help the base station (e.g. gNB) identify which starting position is used by the wireless device. The starting point and the reference signal locations for a slot are composed such that they are distinguishable by the base station (e.g. gNB). An example is depicted in FIG. 8, wherein 3 starting points are depicted within the slot. The gNB can detect when the wireless device (e.g. UE) starts transmitting based on one of the defined starting points. The number of defined starting points is not limited to three, as shown in the example, for example 6 fixed starting points may be defined for the slot where each fixed starting point is 2 or 3 symbols apart, and the associated reference signal configuration for that starting point. The wireless device therefore has three hypotheses for a valid uplink transmission.

Figure 9:
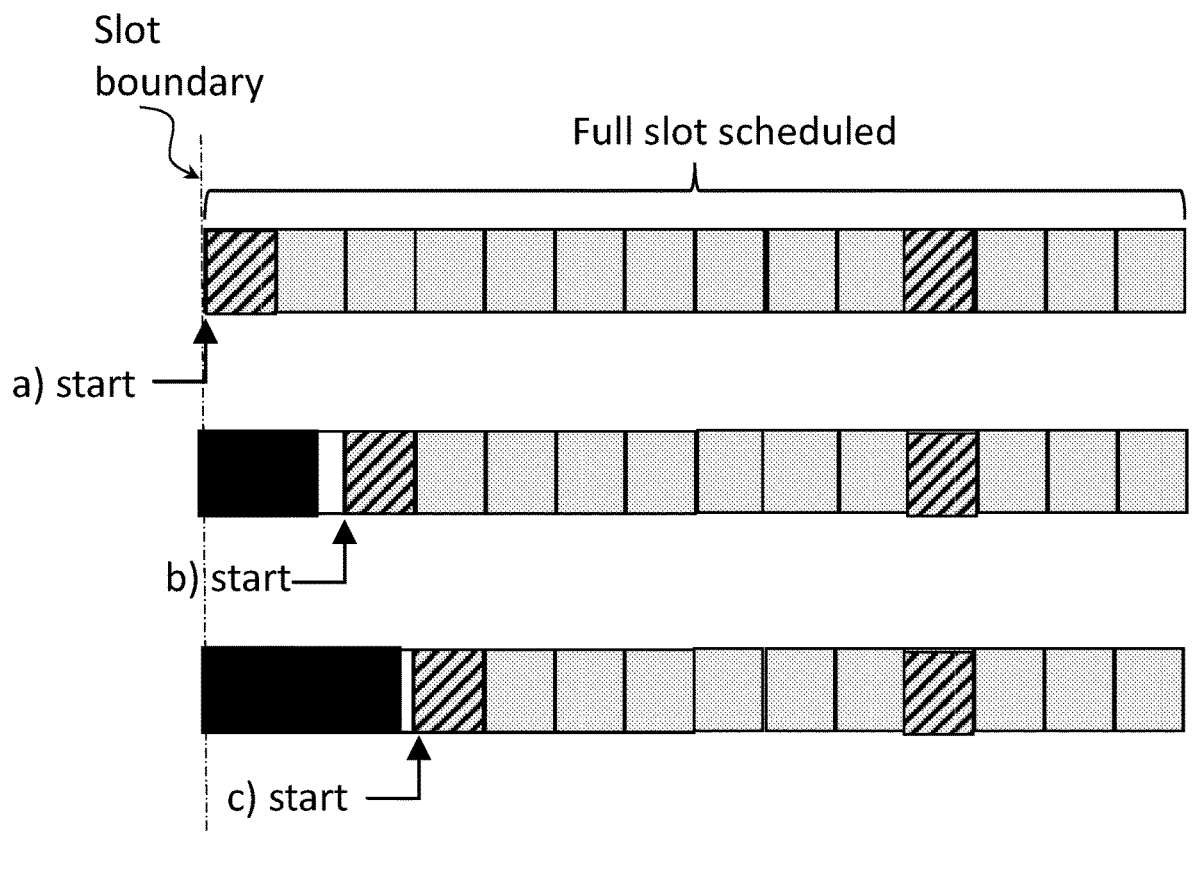
FIG. 9 illustrates further example embodiments of the present disclosure.

In an alternative, the wireless device (e.g. UE) is configured to flexibly choose the starting point of the uplink transmission. However, to mark the start of the transmission, DMRS is sent at least in the first OFDM symbol of the slot. The wireless device may be considered as creating a mini-slot dynamically. As such, mini-slot configuration is predetermined in that the mini-slot comprises the remainder of the slot with the starting position identified by the DMRS, wherein the mini-slot is of variable length and the base station therefore knows to expect any length mini-slot with a DMRS in the first symbol. An example of such an embodiment is depicted in FIG. 9.

To fit the scheduled transport block size (TBS) on the available resource elements (REs) based on the starting position, one of the following may be applied:
  UE rate matches the Transport block to the available REs based on the starting position; or
  UE punctures the transport block. Only part of the transport block is sent on the available REs based on the starting position; or
  the transport block size is selected based on the LBT outcome and the remaining duration of the slot or mini-slot (i.e. the scheduling decision is made after successfully finishing the LBT).

In another aspect the base station (e.g. gNB) considers each slot as one HARQ process and uses the code block group to acknowledge the successfully received code blocks within the partial starting slot transmission.

In some examples the scrambling is made independent of the transmission timing. This allows the wireless device (e.g. UE) to postpone the prepared transmission depending on the listen-before-talk outcome with minimal layer 1 reprocessing. The base station (e.g. gNB) schedules the wireless device (e.g. UE) without a fixed time relationship between the grant and the uplink transmission. In other words, a UE may transmit according to the uplink scheduling assignment after a minimum delay "d1" after the grant was received. If the UE fails to access the channel before a time "M" (the grant is valid for the time window between d1 and M), the UE drops the grant. Periods "d1" and "M" can be configured via RRC or PDCCH.

In some examples the scheduled uplink burst comprises a first X (where X≥1) transmissions prepared as mini slot transmissions to enhance the access to the channel and allow the UE to access the channel at a much finer granularity. In a further example, X is a set of mini-slots that can fit in one slot. A UE has X possible starting points within a slot duration. In some examples the mini slot configuration can be RRC or PDCCH configured. In some examples the DMRS periodicities in (mini) slots can be RRC or PDCCH configured.

In further examples succeeding transmissions within the same uplink transmission burst are transmitted based on a full slot concept with lower signalling overhead.

Figure 10:
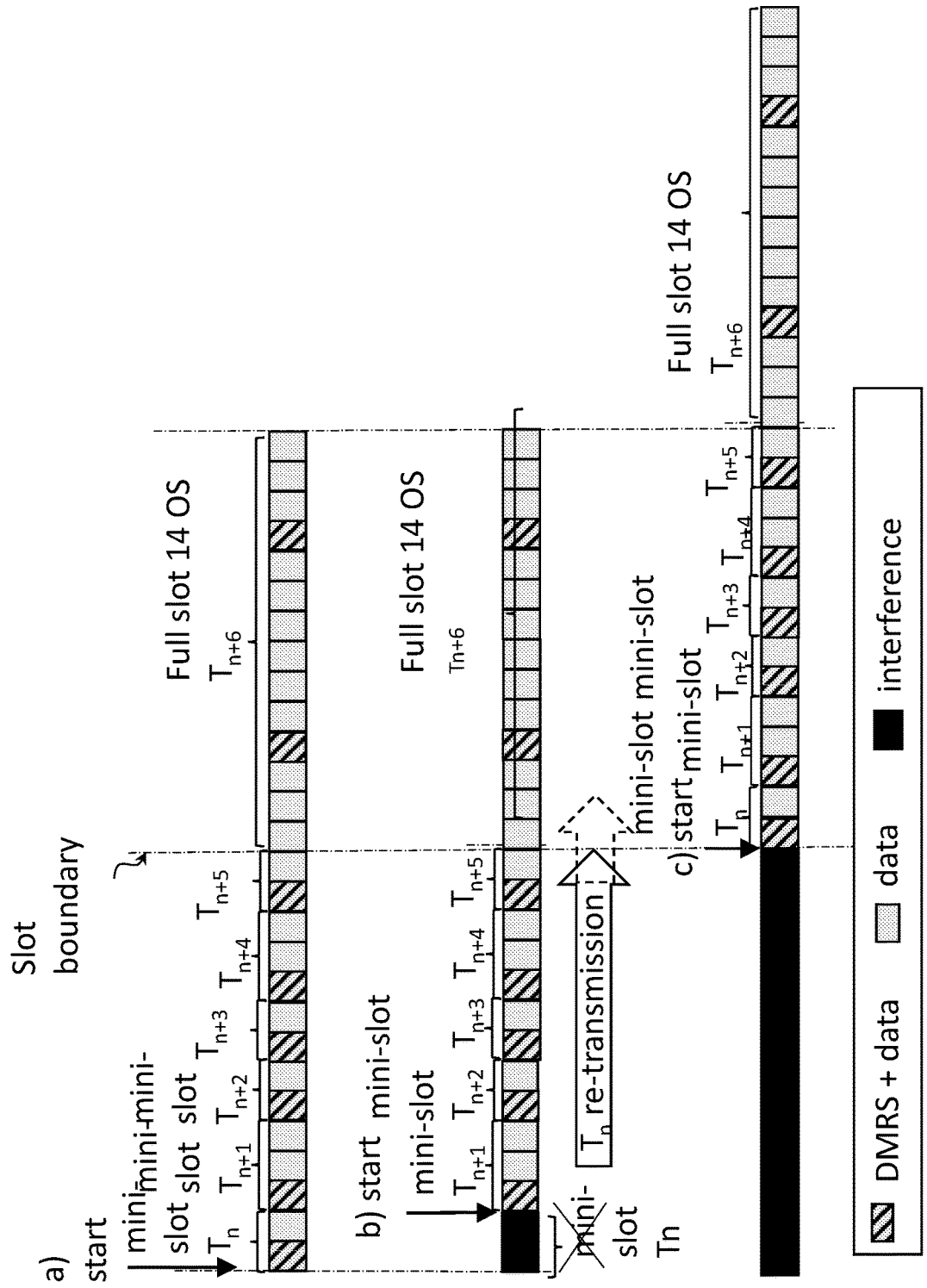
FIG. 10 illustrates further example embodiments of the present disclosure.

FIG. 10, shows an example where the smallest mini slot length used is 2 symbols and a fixed mini-slot configuration of {2,3,2,2,3,2} symbols within a 14 symbol slot is used for the first slot in the uplink transmission burst. A UE has 6 possible starting points within the slot duration. Succeeding transmissions are prepared based on 14 symbol slots. In the example in FIG. 10 a) the transmission starts at the first mini-slot ($T_n$) of the scheduled mini-slot configuration. In the example in FIG. 10 b) the channel is accessed for uplink transmission at the second fixed mini-slot ($T_{n+1}$), the wireless device transmits the prepared transmissions from ($T_{n+1}$) onwards, i.e. the transmission continues with a full slot transmission in the next slot. A mini-slot within a slot does not "float" in time. In this example, the transmission for $T_n$ is "retransmitted" later, i.e. although it was not transmitted in the first place it maybe transmitted in response to a HARQ feedback. The starting points of the mini-slots cannot change. In the example $T_n$ is two symbols long so it cannot be transmitted where $T_{n+1}$ starts, because $T_{n+1}$ is three symbols long. In the example shown in FIG. 10 c) the UE fails to access the channel for all starting opportunities within the first slot, it attempts transmission again at the next slot using the mini-slot granularity as long as the grant is still valid. The succeeding slot transmissions then continue in a full slot configuration.

In some examples, when a base station (e.g. gNB) erroneously detects a UE transmission in the first or subsequent slots, the gNB might map the first successfully detected transmission to the wrong HARQ ID since the relation between the transmitted HARQ ID and the slot index is not fixed. In some examples this is solved by the UE including the HARQ ID in uplink control information.

Figure 11:
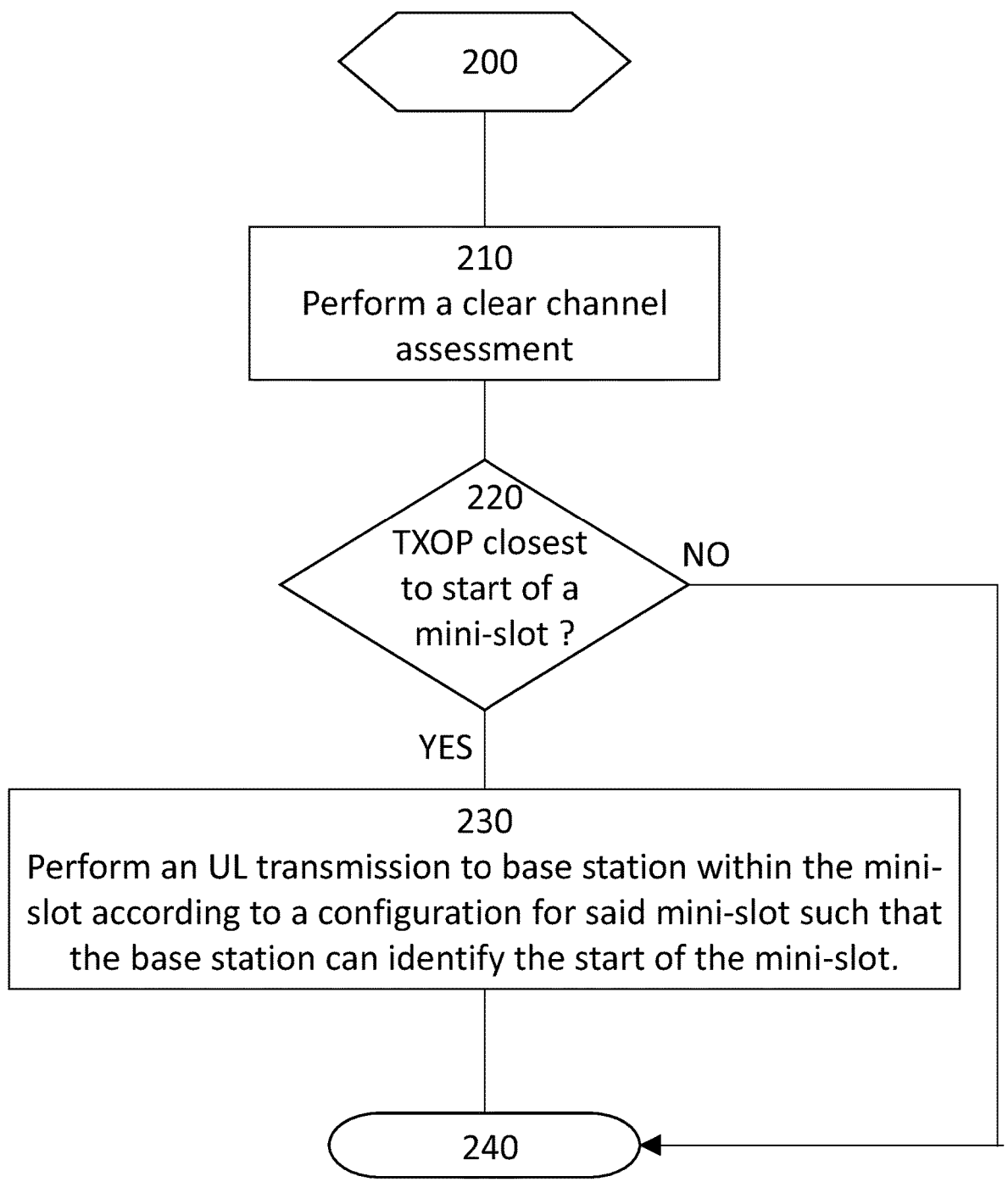
FIG. 11 illustrates an example method of the present disclosure.

The embodiments will now be described in more detail, in conjunction with the FIGS. 11 to 16. In FIG. 11 a method in a wireless device or UE for performing an uplink transmission to a base station. The method starts at step 200 wherein the UE prepares to perform an uplink transmission in a wireless access system which comprises one or more mini-slot configurations. A mini-slot configuration comprises one or more orthogonal frequency division multiplexed, OFDM, symbol intervals and is a sub-division of a slot. At step 210 the UE performs a clear channel assessment (CCA) to determine if the channel is available for the UE to transmit, i.e. to identify a transmission opportunity. If the channel is available the method proceeds to step 220. If the CCA procedure determines the channel is occupied the UE waits a predefined period before performing the CCA again. At step 220 the UE determines whether the start of the transmission opportunity is closest to the start of a slot or the start of one of one or more mini-slots. For example the UE is configured with predetermined mini-slot configurations such as the number of symbols for each of a number of mini-slots which comprise a full slot (i.e. the mini-slot boundaries). If the transmission opportunity begins early in the slot then the UE may be able to transmit in a mini-slot configuration but if the transmission opportunity occurs within the latter part of a slot such then there is no starting mini-slot symbol before the start of the next full slot then the UE could select a full slot transmission. Other examples of defining the mini-slot configurations are described below. The method proceeds at step 230 with the UE performing an uplink transmission within the mini-slot, when the transmission opportunity is closest to the start of one of the one or more mini-slots. The transmission is according to a predetermined configuration for mini-slot communication between the UE and base station such that the base station can identify the start of the uplink transmission in said mini-slot. For example, the mini-slot configuration comprises one of a plurality of mini-slot configurations and wherein each mini-slot configuration defines the number of mini-slots within a slot, the positions of mini-slots within a slot, and the number of OFDM symbols for each mini-slot.

In another example the mini-slot configuration comprises a demodulation reference signal in a configured OFDM symbol position. In a further example every mini-slot includes a demodulation reference signal. The demodulation references signals are modulated with the UL data and their configured location known to the base station such that the base station can determine in which mini-slot the UE has started transmitting. In some examples the demodulation reference signal OFDM symbol location within a mini-slot is different for each mini-slot within the slot. In other examples, one or more demodulation reference signals are shared by one or more consecutive mini-slot transmission. In some examples a subsequent demodulation reference signal is shared by a greater number of consecutive mini-slot transmissions than a preceding demodulation reference signal. In other words the DMRS density decreases as the uplink transmission progresses. In another example a demodulation reference signal is included in the last mini-slot of each slot and shared by the preceding mini-slots of the slot. In other examples one of the one or more demodulation reference signals is included in the first OFDM symbol of the mini-slot of the one or more transmissions. In a further example a demodulation reference signal is included in the first OFDM symbol of the mini-slot in which the start of the uplink transmission occurs.

In another embodiment the UE performs the uplink transmission according to one or more mini-slot configurations of the first slot and performs uplink transmissions for subsequent slots according to a full slot configuration. In some examples the UE receives an indication of the mini-slot configuration from the base station. The indication may be received via dedicated signalling for example in a radio resource control message. In other examples the signalling may be via a broadcast message received by any UE in the serving area.

In some examples the UE receives a scheduling message, for example a downlink control information (DCI), from the base station, wherein the scheduling message comprises scheduling for both mini-slot configurations and slot-configurations. In further examples the scheduling message comprises scheduling one or more mini-slots for an uplink transmission when the start of the transmission opportunity is closest to one of the one or more mini-slots and scheduling a full slot for uplink transmission in subsequent slots. In other examples the uplink transmission in a full slot is the first slot after the slot in which the start of the uplink transmission occurs. In another example the UE transmits in mini-slot configuration for a number of slots before switching to full slot uplink transmission. In other words a full slot transmission occurs at a plurality of slots after the slot in which the start of the uplink transmission occurs. Uplink transmissions following the start of the transmission are transmitted according to the one or more mini-slot configurations up until the full slot transmission commences.

In another example a transport block size for the uplink transmission is adapted between mini-slot transmission and full slot transmission. In some examples, the number of demodulation reference signals in a slot is changed in addition to or instead of adapting the transport block size. The UE may be configured with a plurality of transport block sizes and then the UE selects one of the plurality of transport block sizes depending on whether it is transmitting in mini-slot or full slot. In some examples the UE increases the transport block size when the number of demodulation reference signals per slot is decreased.

In another example a hybrid automatic repeat request (HARQ) process is shared between multiple mini-slots of a slot, thereby reducing the number of HARQ processes needed and enabling the UE to transmit for the whole of the transmission opportunity.

In further examples a HARQ identifier is configured to identify the one or more mini-slot transmissions in the slot for which the HARQ process applies. A HARQ process may comprise a parameter indicating which feedback corresponds to which transport block, for example a sequence of bits (bitmap), wherein each bit represents a feedback for a transport block transmitted over one of the one or more mini-slots.

In other examples the UE may perform rate adaptation of a scheduled transport block based on the number of available resource elements which in turn is based on the start of the transmission opportunity.

In other examples the UE punctures a scheduled transport block, such that only a part of the transport block is sent during the transmission opportunity, based on a number of available resource elements which in turn is based on the start of the transmission opportunity.

In some examples the UE is scheduled independently from an uplink transmission time. This means that the UE receives a scheduling grant but the grant does not stipulate or is not predefined to a fixed transmission time, e.g. n slots after the grant. In other examples the UE is configured with a minimum time which shall pass between receiving an uplink grant and the start of the transmission opportunity. The UE may be further configured with a maximum time which shall pass before the grant is discarded. If the UE is unable to obtain a clear channel before this time expires then it must obtain a new grant. In other examples a scrambling operation of the one or more uplink transmissions is performed independently of the transmission timing of the UL transmission. In some examples a scheduled mini-slot transmission for a mini-slot which is configured in a slot before the start of the transmission opportunity is transmitted in the corresponding mini-slot position of the next slot. In other examples a HARQ identifier for the mini-slot is transmitted in an uplink control information of the mini-slot transmission.

Figure 12:
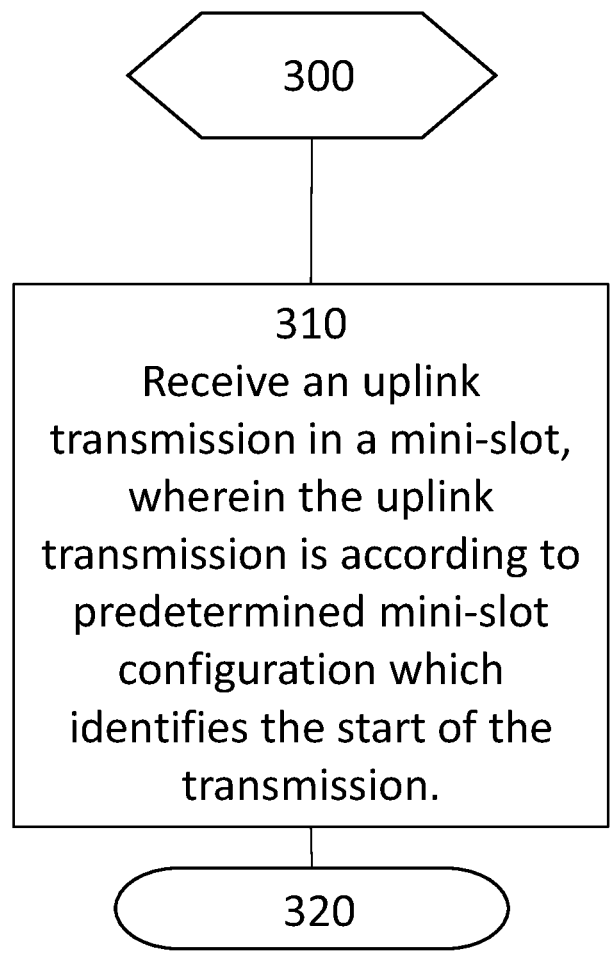
FIG. 12 illustrates a further example method of the present disclosure.

In FIG. 12 a method in a base station is depicted. The method begins at step 300 wherein a base station is prepared for receiving an uplink transmission from a UE in a wireless access system. The wireless access system comprises one or more mini-slot configurations, wherein a mini-slot configuration comprises one or more orthogonal frequency division multiplexed, OFDM, symbol intervals and is a sub-division of a slot. At step 310 the base station receives an uplink transmission from the UE wherein the transmission is within a mini-slot, and the transmission is performed according to a predetermined configuration for mini-slot communication between the base station and the wireless device, such that the base station can identify the start of the uplink transmission.

In some examples the mini-slot configuration comprises one of a plurality of mini-slot configurations wherein, for each slot, the number of mini-slots is fixed, and for each mini-slot the number of OFDM symbols is fixed for that mini-slot and the starting position for that mini-slot, within the slot, is fixed. In other examples the mini-slot configuration comprises a demodulation reference signal in a configured OFDM symbol position.

In some examples every mini-slot includes a demodulation reference signal. In other examples the demodulation reference signal OFDM symbol location within a mini-slot is different for each mini-slot within the slot. In other examples, one or more demodulation reference signals is shared by one or more consecutive mini-slot transmissions.

In some examples a subsequent demodulation reference signal is shared by a greater number of consecutive mini-slot transmissions than a preceding demodulation reference signal. In other examples a demodulation reference signal is included in the last mini-slot of each slot and shared by the preceding mini-slots of the slot. One of the one or more demodulation reference signals may be included in the first OFDM symbol of the mini-slot comprising the one or more transmissions.

In other examples one of the one or more demodulation reference signals is included in the first OFDM symbol of the mini-slot in which the start of the uplink transmission occurs. The method may comprise receiving the start of the uplink transmission within the mini-slot transmission and subsequent mini-slots of that slot and receiving uplink transmissions for a subsequent slot according to a full slot configuration.

In a further embodiment the base station sends an indication of the mini-slot configuration to the UE. The signalling may be dedicated signalling to the UE directly, e.g. radio resource control messaging. Alternatively, the signalling may be broadcast to any UE within the coverage area. In other embodiment the base station sends a scheduling message to the UE, wherein the scheduling message comprises scheduling for both mini-slot configurations and slot-configurations. In some examples the scheduling message comprises scheduling one or more mini-slots for an uplink transmission when the start of the transmission opportunity is closest to one of the one or more mini-slots and scheduling a full slot for uplink transmission in subsequent slots. In some examples the uplink transmission is scheduled to be in a full slot for the first slot after the slot in which the start of the uplink transmission occurs. In some examples the uplink transmission is scheduled for a full slot to occur a plurality of slots after the slot in which the start of the uplink transmission occurs and uplink transmissions following the start of the transmission are transmitted according to the one or more mini-slot configurations up until the full slot transmission commences.

In some examples a transport block size for the uplink transmission is adapted between mini-slot transmission and full slot transmission and/or when the number of demodulation reference signals in a slot changes. The base station may configure the UE with a plurality of transport block sizes. In some embodiments the base station transmits a hybrid automatic repeat request (HARQ) wherein the HARQ process is shared between multiple mini-slots of a slot. In some examples a HARQ identifier is configured to identify the one or more mini-slot transmissions in the slot and wherein the HARQ process includes the HARQ identifier to indicate the mini-slot transmission to which the HARQ process applies. In other examples the HARQ process comprises a bitmap, wherein each bit represents a HARQ feedback for a transport block transmitted over one of the one or more mini-slots.

In some examples the base station receives an uplink transmission which comprises a punctured scheduled transport block, such that only a part of the transport block is sent during the transmission opportunity, based on a number of available resource elements which in turn is based on the start of the transmission opportunity. In some embodiments the base station provides a scheduling message which schedules the UE independently from an uplink transmission time. In some examples the base station configures the UE with a minimum time which shall pass between receiving an uplink grant and the start of the transmission opportunity. In addition, or alternatively the base station may configure the UE with a maximum time which shall pass before the grant is discarded.

In some examples the method comprises receiving an uplink transmission, wherein one or more uplink transmissions are scrambled after the UE has determined the channel to be free. In other examples a scheduled mini-slot transmission for a mini-slot which is configured in a slot before the start of the transmission opportunity is transmitted in the corresponding mini-slot position of the next slot. In further examples a HARQ identifier for the mini-slot is received in an uplink control information of the mini-slot transmission.

Figure 13:
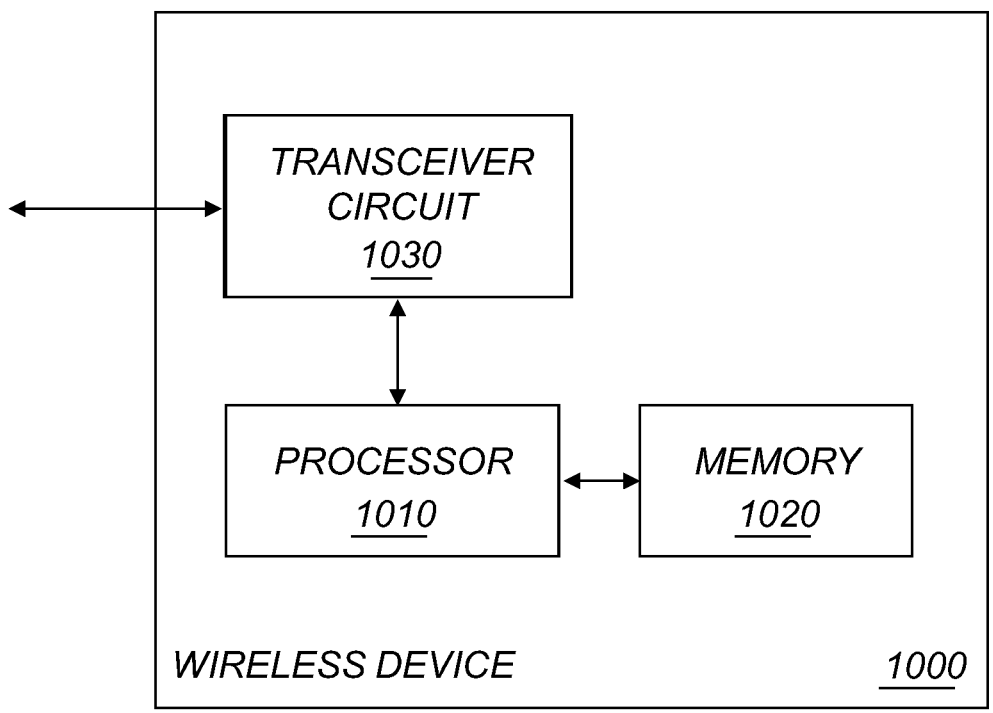
FIG. 13 is a block diagram illustrating example physical units of processing circuitry of a wireless device useful for implementing the methods described herein, according to one or more embodiments of the present disclosure.

FIG. 13 depicts an example wireless device or UE 1000 comprising a processor 1010, a memory 1020 and a transceiver circuit 1030. The wireless device 1000 may comprise multiple processor circuits, multiple memory circuits and multiple transceiver circuits. A transceiver circuit 1020 may comprise separate transmitter and receiver circuitry. The wireless device 1000 is arranged to perform uplink transmissions to a base station in a wireless system, wherein the wireless access system comprises one or more mini-slot configurations, wherein a mini-slot configuration comprises one or more orthogonal frequency division multiplexed, OFDM, symbol intervals and is a sub-division of a slot. The processor 1010 is configured to perform, via the transceiver circuit 1030, a clear channel assessment or listen before talk operation to identify a transmission opportunity. The processor 1010 is further configured to determine whether the start of the transmission opportunity is closest to the start of a slot or the start of one of one or more mini-slots. The processor 1010 is configured to perform, via the transceiver circuit 1030, an uplink transmission within the mini-slot, when the transmission opportunity is closest to the start of one of the one or more mini-slots, wherein the transmission is according to a predetermined configuration for mini-slot communication between the UE and the base station such that the base station can identify the start of the uplink transmission. In other embodiments the wireless device 1000 is further configured to perform rate adaptation of a scheduled transport block based on a number of available resource elements based on the start of the transmission opportunity. In other embodiments the wireless device is further configured to increase the transport block size when the number of demodulation reference signals per slot decreases. In other embodiments the wireless device 1000 is configured to adapt a transport block size for the uplink transmission between mini-slot transmission and full slot transmission and/or when the number of demodulation reference signals in a slot changes.

The wireless device 1000 may be further configured to perform any of the methods pertaining to a wireless device as disclosed above. Such embodiments may be combined in any combination providing improved uplink transmission efficiency.

Figure 14:
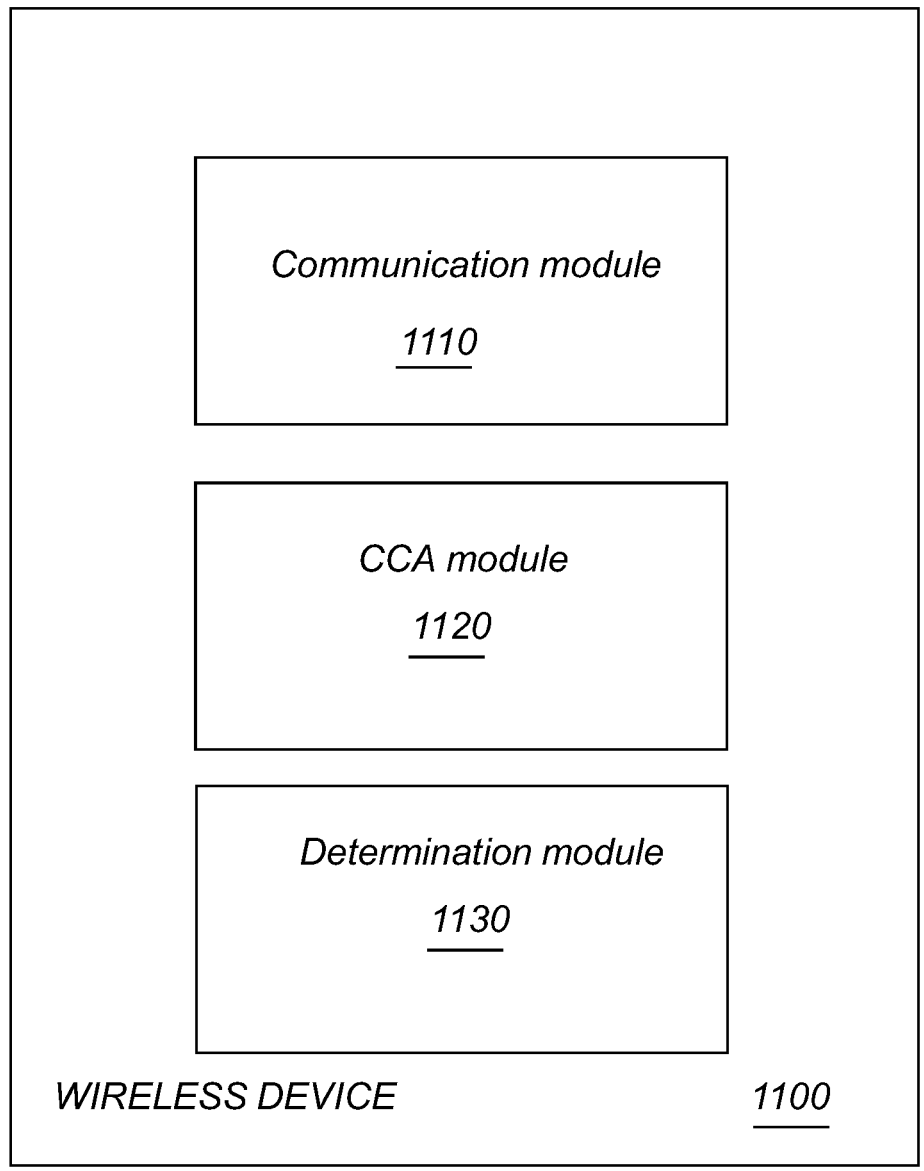
FIG. 14 is a block diagram illustrating example software modules of a computing device wireless device application useful for implementing the methods described herein, according to one or more embodiments of the present disclosure.

FIG. 14 shows a wireless device 1100 comprising a communication module 1110 arranged to perform uplink transmissions to a base station in a wireless access system, wherein the wireless access system comprises one or more mini-slot configurations, wherein a mini-slot configuration comprises one or more orthogonal frequency division multiplexed, OFDM, symbol intervals and is a sub-division of a slot. The communication module 1110 may be further configured to receive scheduling grants which comprise mini-slot specific scheduling. The communication module 1110 may be further configured to receive mini-slot configuration signalling. In some examples the mini-slot configuration defines one or more of a number of symbols for a mini-slot, a number of mini-slots in a slot, a demodulation reference signal configuration, for example whether DMRS occur in every mini-slot, every slot. The wireless device 1100 further comprises a clear channel assessment module 1120 configured to perform a listen before talk or clear channel assessment. The wireless device 1100 further comprises a determination module 1130 which is configured to determine whether the start of a transmission opportunity is closest to the start of a slot or the start of one of one or more mini-slots. The determination module 1130 is configured to direct the communication module 1110 to perform an uplink transmission within the mini-slot, when the transmission opportunity is closest to the start of one of the one or more mini-slots, wherein the transmission is according to a predetermined configuration for mini-slot communication between the UE and the base station such that the base station can identify the start of the uplink transmission.

The wireless device 1100 may be further configured to perform any of the methods pertaining to a wireless device as disclosed above. Such embodiments may be combined in any combination providing improved uplink transmission efficiency.

Figure 15:
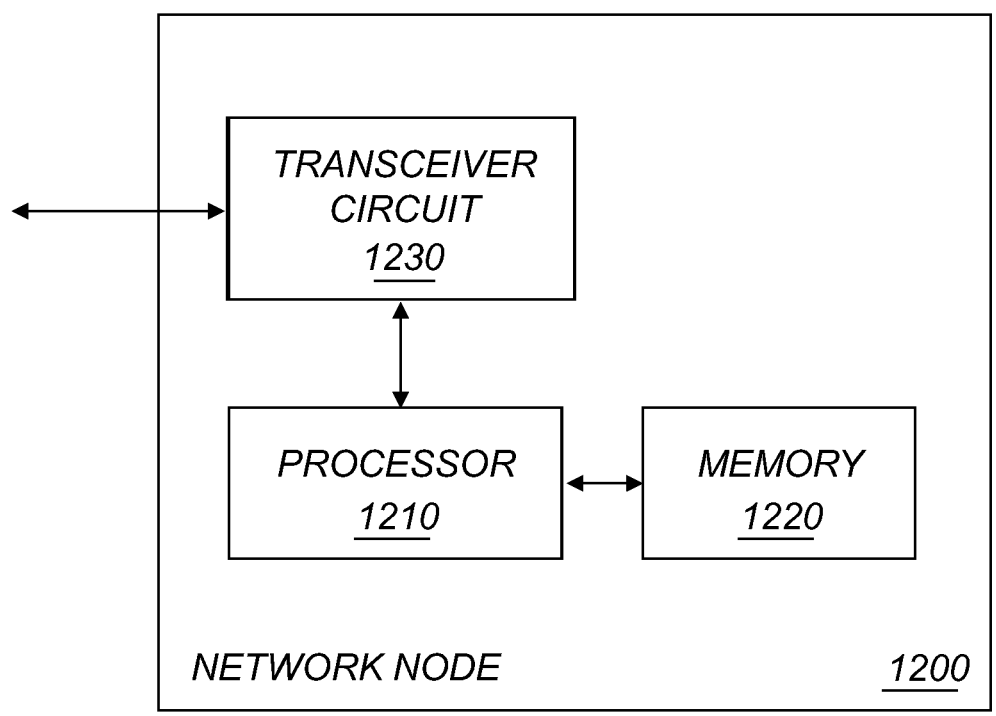
FIG. 15 is a block diagram illustrating example physical units of processing circuitry of a base station useful for implementing the methods described herein, according to one or more embodiments of the present disclosure.

In FIG. 15 an example network node or base station 1200 is depicted wherein the base station 1200 arranged to receive uplink transmissions from a plurality of wireless devices or UEs in a wireless access system. The wireless access system comprises one or more mini-slot configurations, wherein a mini-slot configuration comprises one or more orthogonal frequency division multiplexed, OFDM, symbol intervals and is a sub-division of a slot. The base station 1200 comprises a processor 1210, a memory 1220, and a transceiver circuit 1230. The base station 1200 may comprise multiple processor circuits, multiple memory circuits and multiple transceiver circuits. A transceiver circuit 1230 may comprise separate transmitter and receiver circuitry. The processor 1210 is configured to receive, via the transceiver circuit 1230, an uplink transmission from the wireless device in a mini-slot, wherein the start of the uplink transmission is determined based on predetermined configurations for mini-slot communication between the base station and the UE. In some embodiments the processor 1210 is further configured to send mini-slot configuration information, via the transceiver circuit 1230, to the UE.

In other embodiments the processor 1210 is further configured to send, via the transceiver circuit 1230, a scheduling grant wherein the scheduling grant comprises a scheduled mini-slot transmission. In some examples the scheduling message comprises scheduling one or more mini-slots for an uplink transmission when the start of the transmission opportunity is closest to one of the one or more mini-slots and scheduling a full slot for uplink transmission in subsequent slots. In some examples the scheduling is for the uplink transmission to be in a full slot for the first slot after the slot in which the start of the uplink transmission occurs. In some examples the scheduling is for the uplink transmission to be in a full slot configuration only after a plurality of slots have been transmitted as mini-slots after the slot in which the start of the uplink transmission occurs. In other words, uplink transmissions following the start of the transmission are transmitted according to the one or more mini-slot configurations up until the full slot transmission commences.

The base station 1200 may be further configured to perform any of the methods pertaining to a base station as disclosed above. Such embodiments may be combined in any combination providing improved uplink transmission efficiency and improved means for the base station to determine the start of the transmission when a transmission occurs in a mini-slot configuration.

Figure 16:
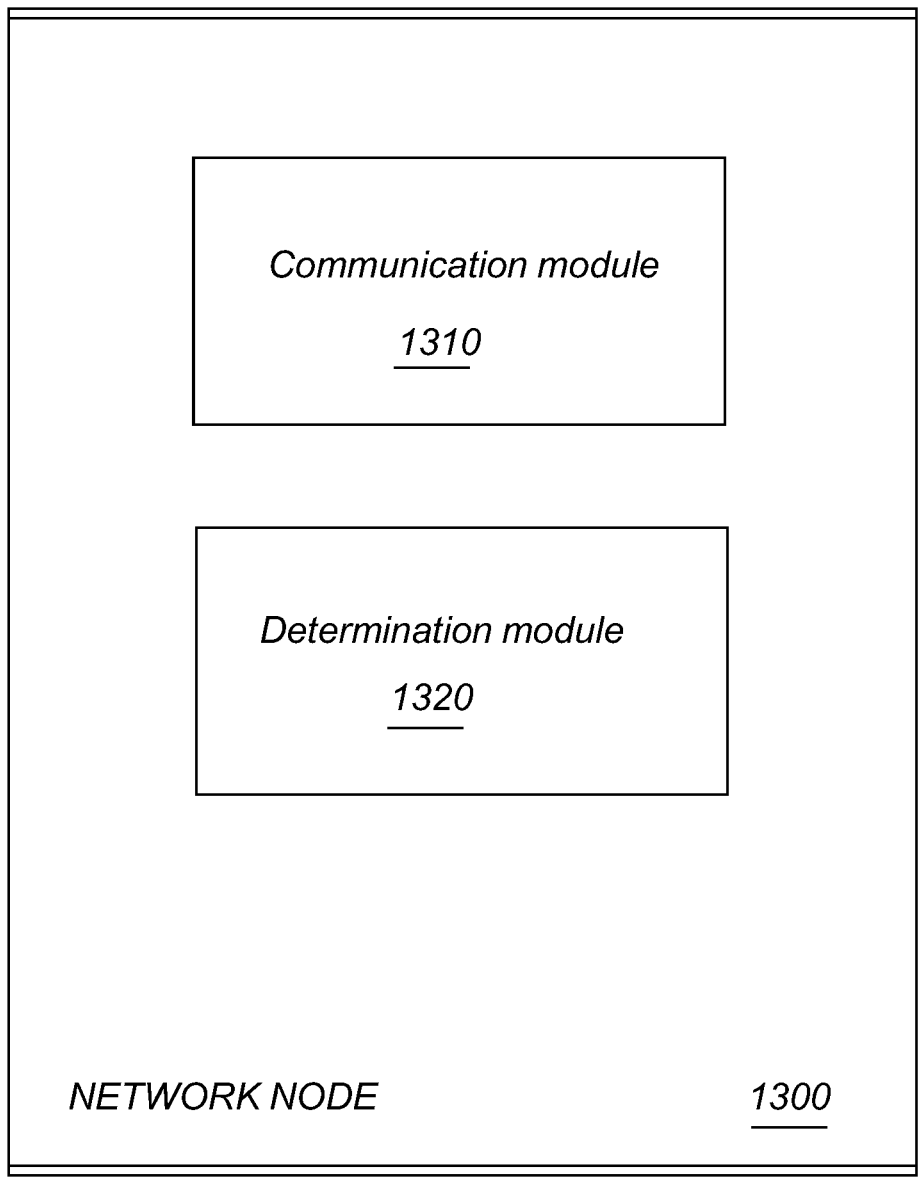
FIG. 16 is a block diagram illustrating example software modules of a base station application useful for implementing the methods described herein, according to one or more embodiments of the present disclosure.

FIG. 16 depicts a network node or base station 1300 comprising a communication module 1310 which is arranged to receive uplink transmissions from a plurality of wireless devices or UEs in a wireless access system. The wireless access system comprises one or more mini-slot configurations, wherein a mini-slot configuration comprises one or more orthogonal frequency division multiplexed, OFDM, symbol intervals and is a sub-division of a slot. The communication module may be further configured to send mini-slot configuration information to the UE.

The communication module 1310 may be further configured to send a scheduling grant to the UE, wherein the scheduling grant comprises a scheduled mini-slot transmission. In some examples the scheduling message comprises scheduling one or more mini-slots for an uplink transmission when the start of the transmission opportunity is closest to one of the one or more mini-slots and scheduling a full slot for uplink transmission in subsequent slots. In some examples the scheduling is for the uplink transmission to be in a full slot for the first slot after the slot in which the start of the uplink transmission occurs. In some examples the scheduling is for the uplink transmission to be in a full slot configuration only after a plurality of slots have been transmitted as mini-slots after the slot in which the start of the uplink transmission occurs. The wireless device further comprises a determination module 1320 configured to determine the start of an uplink transmission from the wireless device, wherein the start of the uplink transmission is determined based on the one or more mini-slot configurations.

The base station 1300 may be further configured to perform any of the methods pertaining to a base station as disclosed above. Such embodiments may be combined in any combination providing improved uplink transmission efficiency and improved means for the base station to determine the start of the transmission when a transmission occurs in a mini-slot configuration.

An aspect provides a computer program or program product for performing an uplink transmission to a base station in a wireless access system, wherein the wireless access system comprises one or more mini-slot configurations, wherein a mini-slot configuration comprises one or more orthogonal frequency division multiplexed, OFDM, symbol intervals and is a sub-division of a slot. The computer program comprises computer code or instructions which, when run on a computer or suitable processing circuitry of a wireless device 1000 perform any of the methods pertaining to a wireless device as disclosed above.

A further aspect of the disclosure provides a carrier containing a computer program comprising instructions which, when executed on at least one processor, causes the at least one processor to carry out the method according to any example.

Another aspect provides a computer program or program product for receiving an uplink transmission from a wireless device in a wireless access system, wherein the wireless access system comprises one or more mini-slot configurations, wherein a mini-slot configuration comprises one or more orthogonal frequency division multiplexed, OFDM, symbol intervals and is a sub-division of a slot. The computer program comprises computer code or instructions which, when run on a computer or suitable processing circuitry of a base station 1200 perform any of the methods pertaining to a base station as disclosed above.

A further aspect of the disclosure provides a carrier containing a computer program comprising instructions which, when executed on at least one processor, causes the at least one processor to carry out the method according to any example.

Figure 17:
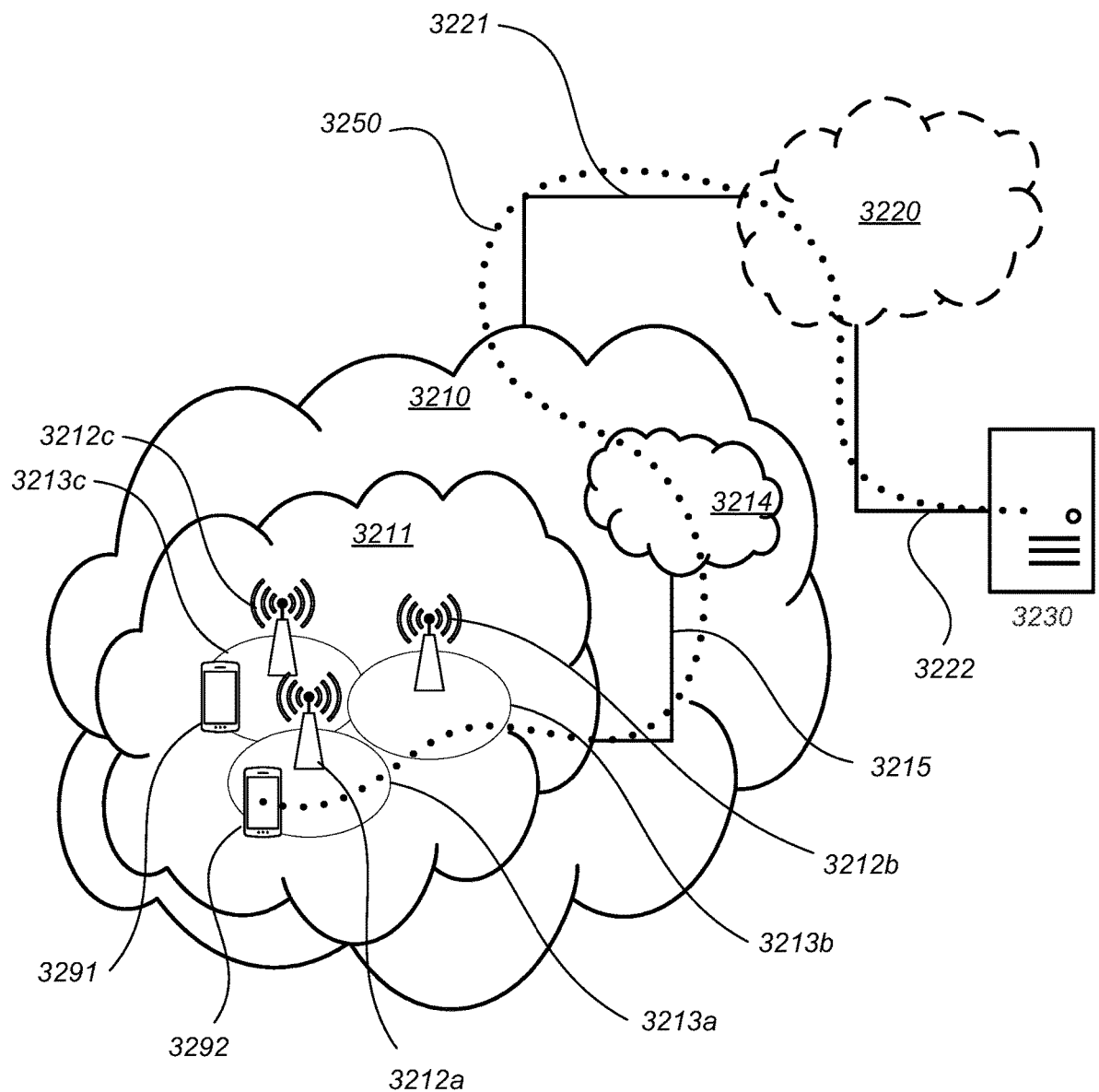
FIG. 17 schematically illustrates a telecommunication network connected via an intermediate network to a host computer.

With reference to FIG. 17, in accordance with an embodiment, a communication system includes a telecommunication network 3210, such as a 3GPP-type cellular network, which comprises an access network 3211, such as a radio access network or base station, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network. The intermediate network 3220, if any, may be a backbone network or the Internet; in particular, the intermediate network 3220 may comprise two or more sub-networks (not shown).

The communication system of FIG. 17, as a whole, enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 18. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 33) served by the base station 3320. The communication interface 3326 may be configured to facilitate a connection 3360 to the host computer 3310. The connection 3360 may be direct or it may pass through a core network (not shown in FIG. 33) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. The hardware 3335 of the UE may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 18:
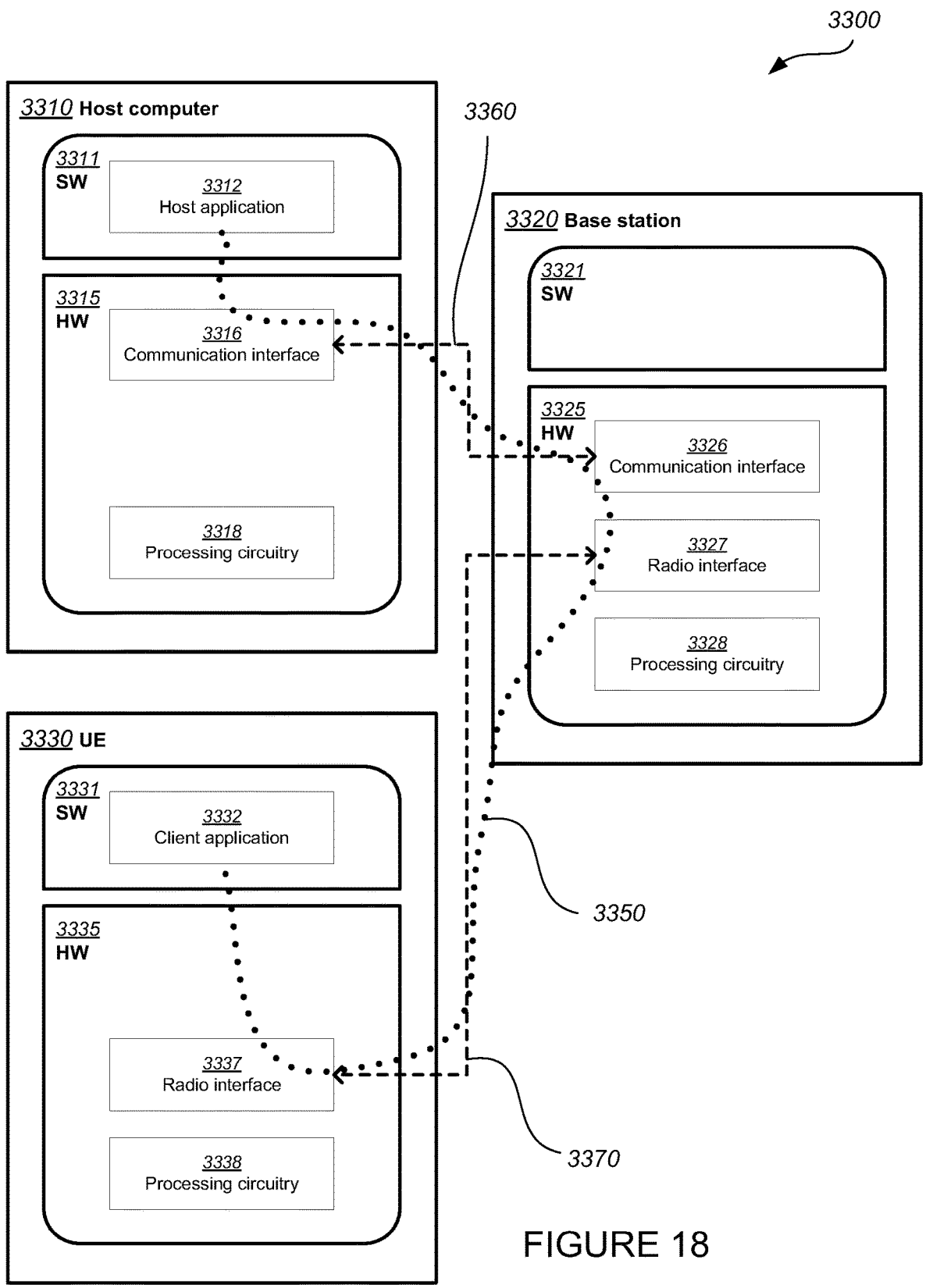
FIG. 18 is a generalized block diagram of a host computer communicating via a base station with a user equipment over a partially wireless connection.

It is noted that the host computer 3310, base station 3320 and UE 3330 illustrated in FIG. 18 may be identical to the host computer 3230, one of the base stations 3212a, 3212b, 3212c and one of the UEs 3291, 3292 of FIG. 17, respectively. This is to say, the inner workings of these entities may be as shown in FIG. 18 and independently, the surrounding network topology may be that of FIG. 17.

In FIG. 18, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, the routing may be configured to be hidden from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the radio access or base station availability and resource ustilisation and provide reduced latency. This provides in turn benefits to the OTT service such as reduced user access time, faster response to user inputs, extended battery lifetime as the UE has reduced number of CCA attempts for a given scheduled transmission burst.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 19, 20:
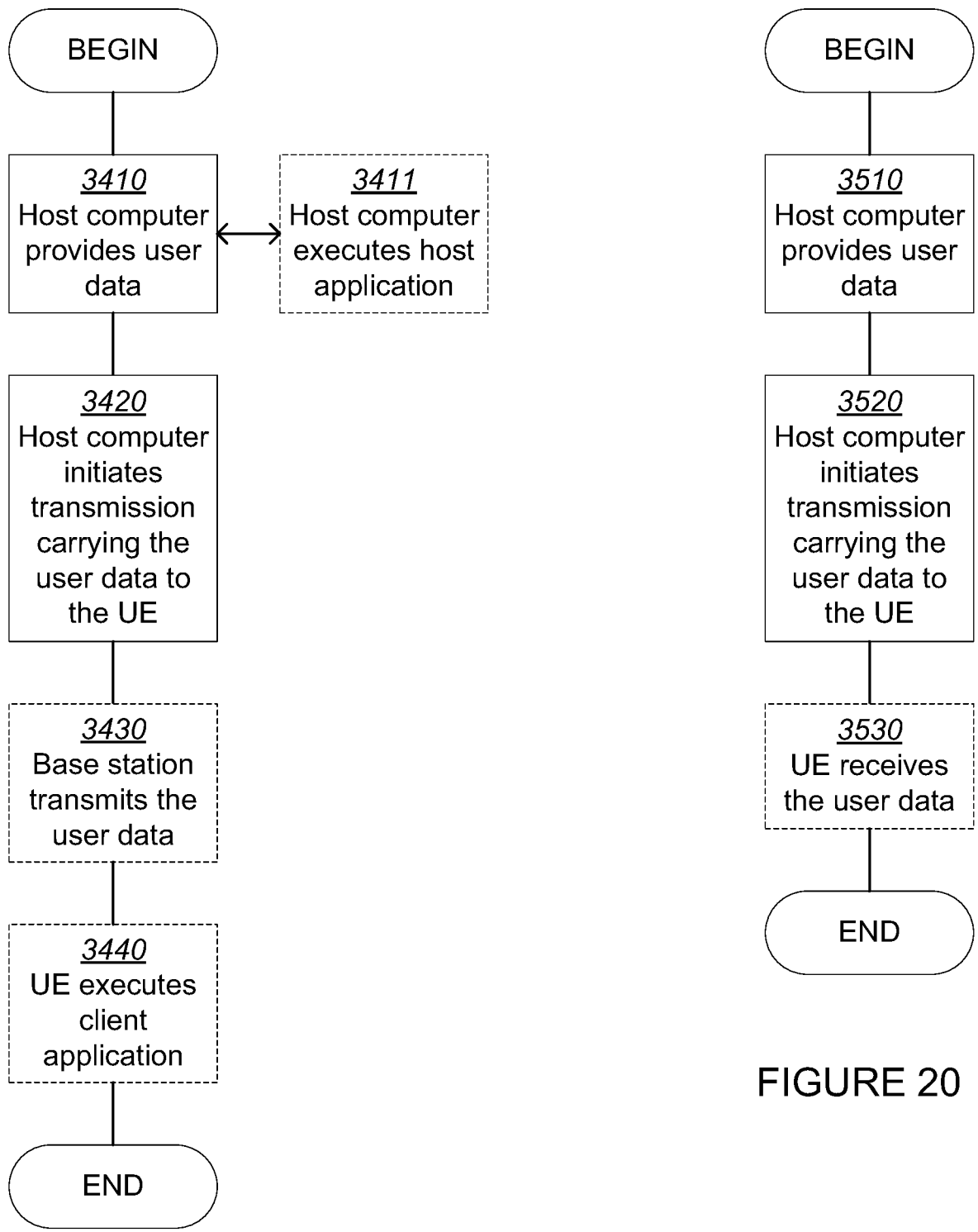
FIGS. 19 to 22 are flowcharts illustrating methods implemented in a communication system including a host computer, a base station and a user equipment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 18 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18.

For simplicity of the present disclosure, only drawing references to FIG. 20 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 21:
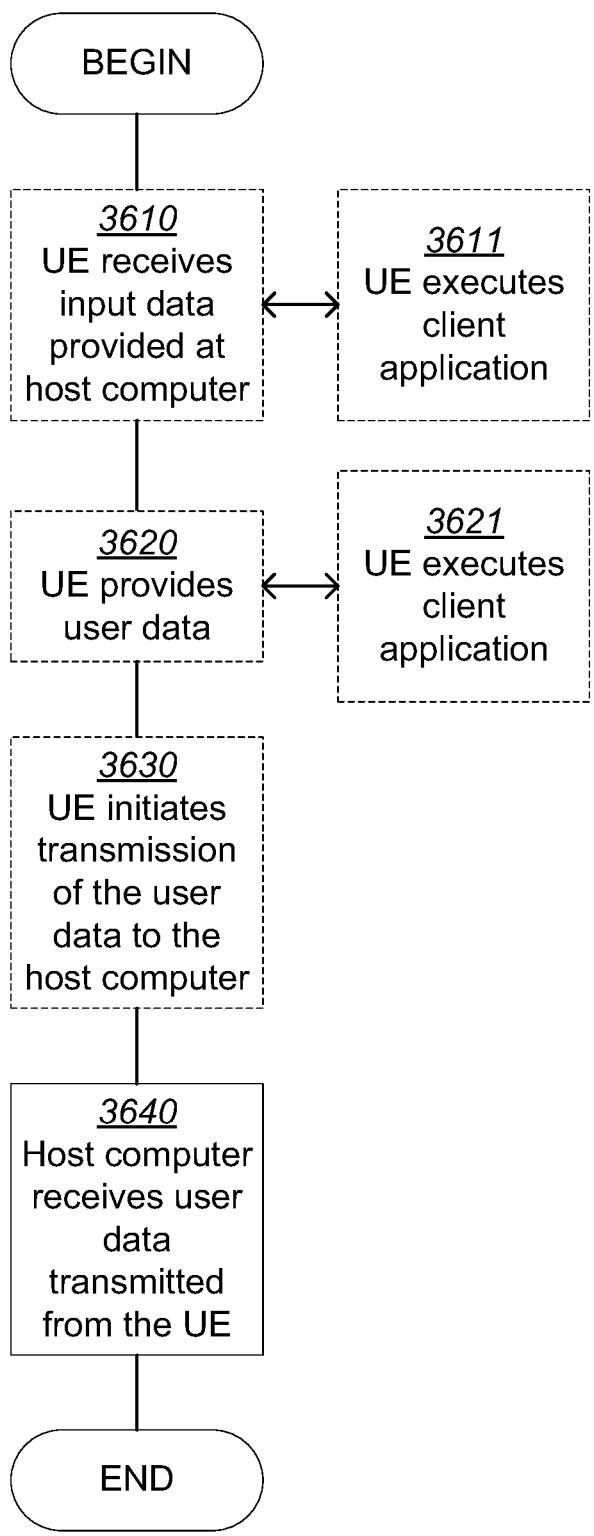

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 22:
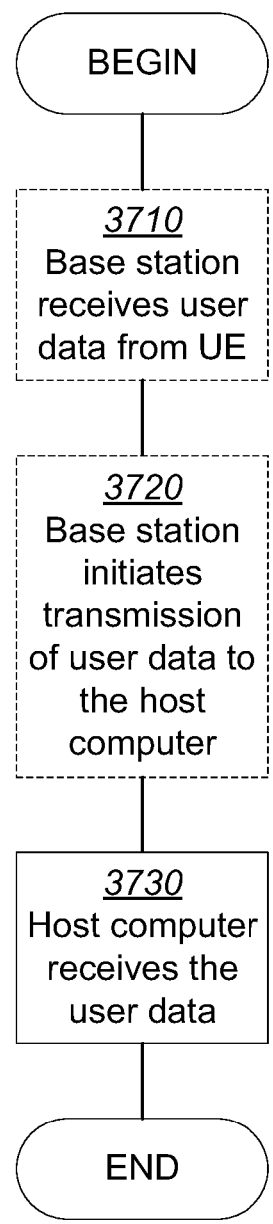

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station. Certain steps in FIGS. 19 to 22 are triggering the clear channel assessment of the previously described embodiments. In other aspects certain steps of FIGS. 19 to 22 are triggered following the uplink transmission performed by the wireless device in one of the embodiments previously disclosed. These interactions are further exemplified below.

In some aspects a communication system including a host computer and a wireless access system, wherein the wireless access system comprises one or more mini-slot configurations, wherein a mini-slot configuration comprises one or more orthogonal frequency division multiplexed, OFDM, symbol intervals and is a sub-division of a slot, the communication system further comprises:

a communication interface configured to receive user data originating from a transmission from a user equipment (UE) to a base station,
wherein the UE comprises a radio interface and processing circuitry, the UE's processing circuitry configured to perform a clear channel assessment;
determine whether the start of a transmission opportunity is closest to the start of a slot or the start of one of one or more mini-slots; and
perform an uplink transmission within the mini-slot, when the transmission opportunity is closest to the start of one of the one or more mini-slots, wherein the transmission is according to a configuration for said mini-slot such that the base station can identify the start of the uplink transmission in said mini-slot. In some examples the communication system comprises the UE. In other examples the communication system further includes the base station, wherein the base station comprises a radio interface configured to communicate with the UE and a communication interface configured to forward to the host computer the user data carried by a transmission from the UE to the base station.

In some aspects the processing circuitry of the host computer is configured to execute a host application; and
the UE's processing circuitry is configured to execute a client application associated with the host application, thereby providing the user data.

In some examples the processing circuitry of the host computer is configured to execute a host application, thereby providing request data; and
the UE's processing circuitry is configured to execute a client application associated with the host application, thereby providing the user data in response to the request data.

In some aspects of the embodiments previously disclosed the wireless device or UE performs the uplink transmission which further comprises providing user data; and
forwarding the user data to a host computer via the transmission to the base station.

In other aspects a method is implemented in a communication system including a host computer, a base station and a user equipment (UE), comprising a wireless access system, wherein the wireless access system comprises one or more mini-slot configurations, wherein a mini-slot configuration comprises one or more orthogonal frequency division multiplexed, OFDM, symbol intervals and is a sub-division of a slot, the method comprising:

at the host computer, receiving user data transmitted to the base station from the UE, wherein the UE performs a clear channel assessment;

determines whether the start of a transmission opportunity is closest to the start of a slot or the start of one of one or more mini-slots; and performs an uplink transmission within the mini-slot, when the transmission opportunity is closest to the start of one of the one or more mini-slots, wherein the transmission is according to a configuration for said mini-slot such that the base station can identify the start of the uplink transmission in said mini-slot.

In some examples the method further comprises:

at the UE, executing a client application, thereby providing the user data to be transmitted; and at the host computer, executing a host application associated with the client application.

In further examples the method further comprises:

at the UE, executing a client application; and at the UE, receiving input data to the client application, the input data being provided at the host computer by executing a host application associated with the client application, wherein the user data to be transmitted is provided by the client application in response to the input data.

In some aspects a communication system including a host computer and a wireless access system, wherein the wireless access system comprises one or more mini-slot configurations, wherein a mini-slot configuration comprises one or more orthogonal frequency division multiplexed, OFDM, symbol intervals and is a sub-division of a slot, the communication system further comprising a communication interface is configured to receive user data originating from a transmission from a user equipment (UE) to a base station, wherein the base station comprises a radio interface and processing circuitry, the base station's processing circuitry configured to receiving an uplink transmission from the wireless device, wherein the start of the uplink transmission is determined based on the one or more mini-slot configurations.

In some examples the communication system further includes the base station.

In further examples the communication system includes the UE, wherein the UE is configured to communicate with the base station.

In some examples the processing circuitry of the host computer is configured to execute a host application;

the UE is configured to execute a client application associated with the host application, thereby providing the user data to be received by the host computer.

In other aspects a method is implemented in a communication system including a host computer, a base station and a user equipment (UE), comprising a wireless access system, wherein the wireless access system comprises one or more mini-slot configurations, wherein a mini-slot configuration comprises one or more orthogonal frequency division multiplexed, OFDM, symbol intervals and is a sub-division of a slot, the method comprising:

at the host computer, receiving, from the base station, user data originating from a transmission which the base station has received from the UE, wherein the UE performs a clear channel assessment;

determines whether the start of a transmission opportunity is closest to the start of a slot or the start of one of one or more mini-slots; and performs an uplink transmission within the mini-slot, when the transmission opportunity is closest to the start of one of the one or more mini-slots, wherein the transmission is according to a configuration for said mini-slot such that the base station can identify the start of the uplink transmission in said mini-slot.

In some examples the method further comprises, at the base station, receiving the user data from the UE. The method may further comprise, at the base station, initiating a transmission of the received user data to the host computer.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method implemented by a wireless device for performing an uplink transmission to a base station in a wireless access system, wherein the wireless access system comprises one or more mini-slot configurations, wherein a mini-slot configuration comprises one or more orthogonal frequency division multiplexed, OFDM, symbol intervals and is a sub-division of a slot, the method comprising:

performing a clear channel assessment to identify a transmission opportunity;

determining the start of a mini-slot that is closest to the start of the transmission opportunity;

performing an uplink transmission within the determined mini-slot, wherein the transmission is performed according to a predetermined configuration of the determined mini-slot for mini-slot communication between the base station and the wireless device, such that the base station can identify the start of the uplink transmission.

2. The method of claim 1, wherein the mini-slot configuration comprises one of a plurality of mini-slot configurations and wherein each mini-slot configuration defines the number of mini-slots within a slot, the positions of mini-slots within a slot, and the number of OFDM symbols for each mini-slot.

3. The method according to claim 1, wherein a demodulation reference signal is included in either:

the last mini-slot of each slot and shared by the preceding mini-slots of the slot;

the first OFDM symbol of the mini-slot in which the start of the uplink transmission one of the one or more demodulation reference signals is included in the first OFDM symbol of each mini-slot of the uplink transmission.

4. The method according to claim 1 further comprising performing the uplink transmission according to a mini-slot configuration for the first slot and performing uplink transmissions for a subsequent slot according to a full slot configuration.

5. The method according to claim 1, wherein a plurality of mini-slot configurations are preconfigured and determining the start of a mini-slot that is closest to the start of the transmission opportunity comprises selecting one of the plurality of mini-slot configurations.

6. The method according to claim 5, further comprising receiving an indication from the base station, the indication comprising at least one of:
the plurality of mini-slot configurations;
a mini-slot configuration to be used for the uplink transmission;
scheduling for both mini-slot configurations and slot-configurations.

7. The method according to claim 6, wherein the scheduling comprises scheduling one or more mini-slots for an uplink transmission when the start of the transmission opportunity is closest to one of the one or more mini-slots and scheduling a full slot for uplink transmission in subsequent slots.

8. The method according to claim 7 wherein the uplink transmission in a full slot is one of:
the first slot after the slot in which the start of the uplink transmission occurs;
a plurality of slots after the slot in which the start of the uplink transmission occurs, and
uplink transmissions following the start of the transmission are transmitted according to the one or more mini-slot configurations up until the full slot transmission commences.

9. The method according to claim 1 wherein a transport block size for the uplink transmission is adapted between mini-slot transmission and full slot transmission and/or the transport block size for the uplink transmission is adapted when the number of demodulation reference signals in a slot changes.

10. The method according to claim 9, wherein the wireless device is either configured with a plurality of transport block sizes; or
the wireless device increases the transport block size when the number of demodulation reference signals per slot is decreased.

11. The method according to claim 1, wherein a hybrid automatic repeat request (HARQ) process is shared between multiple mini-slots of a slot.

12. The method according to claim 11, wherein a HARQ identifier is configured to identify the one or more mini-slot transmissions in the slot for which the HARQ process applies.

13. The method according to claim 11, wherein the HARQ process comprises a bitmap, wherein each bit represents a feedback for a transport block transmitted over one of the one or more mini-slots.

14. The method according to claim 1, further comprising the wireless device performing rate adaptation of a scheduled transport block based on a number of available resource elements based on the start of the transmission opportunity.

15. The method according to claim 1, wherein the wireless device punctures a scheduled transport block, such that only a part of the transport block is sent during the transmission opportunity, based on a number of available resource elements based on the start of the transmission opportunity.

16. The method according to claim 1 wherein the wireless device is either scheduled independently from an uplink transmission time; or
configured with a minimum time which shall pass between receiving an uplink grant and the start of the transmission opportunity and configured with a maximum time which shall pass before the grant is discarded.

17. The method according to claim 16, wherein a scrambling operation of the one or more uplink transmissions is performed independently of the time of transmission.

18. A method performed by a base station for receiving an uplink transmission from a wireless device in a wireless access system, wherein the wireless access system comprises one or more mini-slot configurations, wherein a mini-slot configuration comprises one or more orthogonal frequency division multiplexed, OFDM, symbol intervals and is a sub-division of a slot, the method comprising:
receiving an uplink transmission, from the wireless device, within a mini-slot, wherein the transmission is performed according to a predetermined configuration of the determined mini-slot for mini-slot communication between the base station and the wireless device, such that the base station can identify the start of the uplink transmission.

19. A wireless device for performing an uplink transmission to a base station in a wireless access system, wherein the wireless access system comprises one or more mini-slot configurations, wherein a mini-slot configuration comprises one or more orthogonal frequency division multiplexed, OFDM, symbol intervals and is a sub-division of a slot, the wireless device comprising a processor, a memory and a transceiver circuit, wherein the processor is configured to:
perform, via the transceiver circuit, a clear channel assessment to identify a transmission opportunity;
determine the start of a mini-slot that is closest to the start of the transmission opportunity;
perform, via the transceiver circuit, an uplink transmission within the determined mini-slot, wherein the transmission is performed according to a predetermined configuration of the determined mini-slot for mini-slot communication between the base station and the wireless device, such that the base station can identify the start of the uplink transmission.

20. The wireless device of claim 19, wherein the mini-slot configuration comprises one of a plurality of mini-slot configurations and wherein each mini-slot configuration defines the number of mini-slots within a slot, the positions of mini-slots within a slot, and the number of OFDM symbols for each mini-slot.

21. A base station for receiving an uplink transmission from a wireless device in a wireless access system, wherein the wireless access system comprises one or more mini-slot configurations, wherein a mini-slot configuration comprises one or more orthogonal frequency division multiplexed, OFDM, symbol intervals and is a sub-division of a slot, the base comprising a processor, a memory and a transceiver circuit wherein the processor is configured to receive, via the transceiver circuit, an uplink transmission, from the wireless device, within a mini-slot, wherein the transmission is performed according to a predetermined configuration of the determined mini-slot for mini-slot communication between the base station and the wireless device, such that the base station can identify the start of the uplink transmission.

22. A non-transitory computer program, program product or carrier containing a program comprising instructions for either performing an uplink transmission to a base station in a wireless access system, wherein the wireless access system comprises one or more mini-slot configurations, wherein a mini-slot configuration comprises one or more orthogonal frequency division multiplexed, OFDM, symbol intervals and is a sub-division of a slot, the instructions, when executed on a processor, perform any of the method of claim 1;
or receiving an uplink transmission from a wireless device in a wireless access system, wherein the wireless access system comprises one or more mini-slot configurations, wherein a mini-slot configuration comprises one or more orthogonal frequency division multiplexed, OFDM, symbol intervals and is a sub-division of a slot, the instructions, when executed on a processor.

* * * * *